(12) United States Patent
Ohashi et al.

(10) Patent No.: US 10,285,391 B2
(45) Date of Patent: May 14, 2019

(54) METHOD AND APPARATUS FOR JOINING A FISHING LINE TO ANOTHER FISHING COMPONENT, FOR ADJUSTING THE BUOYANCY OF FISHING COMPONENTS, AND FOR CUTTING A FISHING LINE

(71) Applicant: TAUTEN, INC., Beverly, MA (US)

(72) Inventors: Kevin L. Ohashi, Jamaica Plain, MA (US); Paul V. Fenton, Marblehead, MA (US)

(73) Assignee: TAUTEN, INC., Beverly, MA (US)

( * ) Notice: Subject to any disclaimer, the term of this patent is extended or adjusted under 35 U.S.C. 154(b) by 0 days.

(21) Appl. No.: 14/161,239

(22) Filed: Jan. 22, 2014

(65) Prior Publication Data

US 2014/0202060 A1    Jul. 24, 2014

Related U.S. Application Data

(60) Provisional application No. 61/755,281, filed on Jan. 22, 2013.

(51) Int. Cl.
| | |
|---|---|
| *A01K 91/03* | (2006.01) |
| *A01K 91/04* | (2006.01) |
| *A01K 91/047* | (2006.01) |
| *A01K 97/00* | (2006.01) |

(52) U.S. Cl.
CPC .............. *A01K 91/04* (2013.01); *A01K 91/03* (2013.01); *A01K 91/047* (2013.01); *A01K 97/00* (2013.01); *Y10T 83/04* (2015.04)

(58) Field of Classification Search
CPC ........ A01K 91/06; A01K 97/18; A01K 91/03; A01K 91/04

USPC .............. 43/4.5, 17.2, 43.12, 43.13
See application file for complete search history.

(56) References Cited

U.S. PATENT DOCUMENTS

| | | | |
|---|---|---|---|
| 893,173 A | 7/1908 | Kunze | |
| 2,449,349 A | 9/1948 | Waugh et al. | |
| 2,578,289 A * | 12/1951 | Danielson | A01K 97/18 |
| | | | 43/53.5 |
| 2,995,159 A | 8/1961 | Berggren | |
| 3,284,257 A | 11/1966 | Soloff et al. | |
| 3,419,924 A * | 1/1969 | Archibald | A01K 91/04 |
| | | | 43/53.5 |
| 3,512,223 A | 5/1970 | Willinger | |
| 3,608,034 A | 9/1971 | Bramley et al. | |
| 3,629,541 A | 12/1971 | Mims et al. | |
| 3,970,735 A | 7/1976 | Nelson | |
| 4,011,869 A | 3/1977 | Seiler, Jr. | |
| 4,700,313 A | 10/1987 | Orwin | |
| 5,084,058 A | 1/1992 | Li | |
| 5,133,723 A | 7/1992 | Li et al. | |

(Continued)

FOREIGN PATENT DOCUMENTS

| | | |
|---|---|---|
| EP | 1270485 | 1/2003 |
| FR | 1320382 | 3/1963 |

(Continued)

*Primary Examiner* — Lisa L Tsang
(74) *Attorney, Agent, or Firm* — Pandiscio & Pandiscio

(57) ABSTRACT

Apparatus for cutting a fishing line, said apparatus including a hollow shaft having a proximal end, a distal end, and a lumen extending therebetween; a slot formed in said hollow shaft and communicating with said lumen; and a cutter shaft movably disposed within said lumen so as to selectively cross said slot, whereby to cut a fishing line disposed in said slot.

8 Claims, 41 Drawing Sheets

(56) References Cited

U.S. PATENT DOCUMENTS

| | | |
|---|---|---|
| 5,150,539 A | 9/1992 | Sorola |
| 5,288,359 A | 2/1994 | Stobbie, IV et al. |
| 5,507,760 A * | 4/1996 | Wynne ........... A61B 17/320783 606/159 |
| 5,656,126 A | 8/1997 | Martinez |
| 5,660,317 A | 8/1997 | Singer et al. |
| 5,752,964 A | 5/1998 | Mericle |
| 5,983,555 A * | 11/1999 | Biel ........................ A01K 97/18 43/53.5 |
| 6,038,806 A | 3/2000 | Maitland |
| 6,086,806 A | 7/2000 | Weatherall et al. |
| D440,294 S | 4/2001 | Bilek |
| D453,332 S | 2/2002 | Herath |
| 6,382,496 B1 | 5/2002 | Harger |
| D466,150 S | 11/2002 | Matsumoto et al. |
| D466,918 S | 12/2002 | Shiozaki et al. |
| 6,508,030 B1 | 1/2003 | Sovik |
| D477,357 S | 7/2003 | Nakajima et al. |
| 6,703,750 B2 | 3/2004 | Nakamura |
| 6,789,724 B2 | 9/2004 | Cordier et al. |
| 6,793,750 B2 | 9/2004 | Bittar |
| D500,836 S | 1/2005 | Nishi et al. |
| D501,459 S | 2/2005 | Sarich et al. |
| 6,884,249 B2 | 4/2005 | May et al. |
| D581,988 S | 12/2008 | Hall et al. |
| D592,732 S | 5/2009 | Sneddon et al. |
| D616,491 S | 5/2010 | Yomoda et al. |
| D636,017 S | 4/2011 | Takiguchi et al. |
| D636,477 S | 4/2011 | Anderson et al. |
| 7,938,847 B2 | 5/2011 | Fanton et al. |
| 8,028,466 B1 * | 10/2011 | Schrock ................ A01K 69/00 114/221 A |
| 8,074,864 B2 | 12/2011 | Lofton et al. |
| 8,109,945 B2 | 2/2012 | Boehlke |
| 8,365,460 B2 | 2/2013 | Brown |
| D697,131 S | 1/2014 | Hasui et al. |
| D705,287 S | 5/2014 | Schmid et al. |
| 8,714,409 B2 | 5/2014 | Muller-Paul |
| D707,819 S | 6/2014 | Nalagatla et al. |
| D711,502 S | 8/2014 | Savoy et al. |
| D712,356 S | 9/2014 | Windom |
| D712,507 S | 9/2014 | Hammerback |
| D714,863 S | 10/2014 | Borkovec et al. |
| D715,355 S | 10/2014 | Otsubo et al. |
| D716,909 S | 11/2014 | Hammarback |
| D723,462 S | 3/2015 | Druker et al. |
| D723,653 S | 3/2015 | Peterson |
| D725,470 S | 3/2015 | Wilcox et al. |
| D731,204 S | 6/2015 | Watson et al. |
| D733,871 S | 7/2015 | Wilcox et al. |
| D737,518 S | 8/2015 | Yiu |
| D742,550 S | 11/2015 | Mitchell |
| D749,382 S | 2/2016 | Matsuoka et al. |
| D752,732 S | 3/2016 | Ansley et al. |
| D755,344 S | 5/2016 | Reckin et al. |
| D762,812 S | 8/2016 | Branscomb et al. |
| D767,822 S | 9/2016 | Jordan et al. |
| D780,887 S | 3/2017 | Huda et al. |
| D781,376 S | 3/2017 | Hakukawa et al. |
| D782,259 S | 3/2017 | Rahm et al. |
| D796,574 S | 9/2017 | Kamoshida et al. |
| 2002/0139035 A1 * | 10/2002 | King ...................... B26B 27/00 43/17.2 |
| 2002/0187076 A1 | 12/2002 | DiCesare et al. |
| 2003/0000621 A1 | 1/2003 | Bittar |
| 2003/0120287 A1 * | 6/2003 | Gross ................. A61B 17/0467 606/148 |
| 2004/0254598 A1 | 12/2004 | Schumacher et al. |
| 2006/0271074 A1 * | 11/2006 | Ewers ................ A61B 17/0401 606/148 |
| 2007/0031183 A1 | 2/2007 | Sim |
| 2009/0155516 A1 | 6/2009 | Kobayashi et al. |
| 2009/0228026 A1 | 9/2009 | Koogle, Jr. et al. |
| 2009/0315214 A1 | 12/2009 | Heikkila et al. |
| 2010/0153061 A1 | 6/2010 | Hietmann et al. |
| 2010/0159197 A1 | 6/2010 | Ferguson et al. |
| 2011/0238113 A1 | 9/2011 | Fanton et al. |
| 2013/0010082 A1 | 1/2013 | Silverbrook |
| 2013/0277393 A1 | 10/2013 | Rahm et al. |
| 2014/0097554 A1 | 4/2014 | Fenton et al. |
| 2014/0202060 A1 | 7/2014 | Ohashi et al. |
| 2014/0291384 A1 | 10/2014 | Canelo |
| 2014/0319104 A1 | 10/2014 | Kemmerer-Fleckenstein |
| 2015/0367567 A1 | 12/2015 | Biehl et al. |
| 2015/0373824 A1 | 12/2015 | Nettesheim et al. |

FOREIGN PATENT DOCUMENTS

| | | |
|---|---|---|
| GB | 634286 | 3/1950 |
| GB | 2 449 297 | 11/2008 |
| JP | 57029441 | 2/1982 |

* cited by examiner

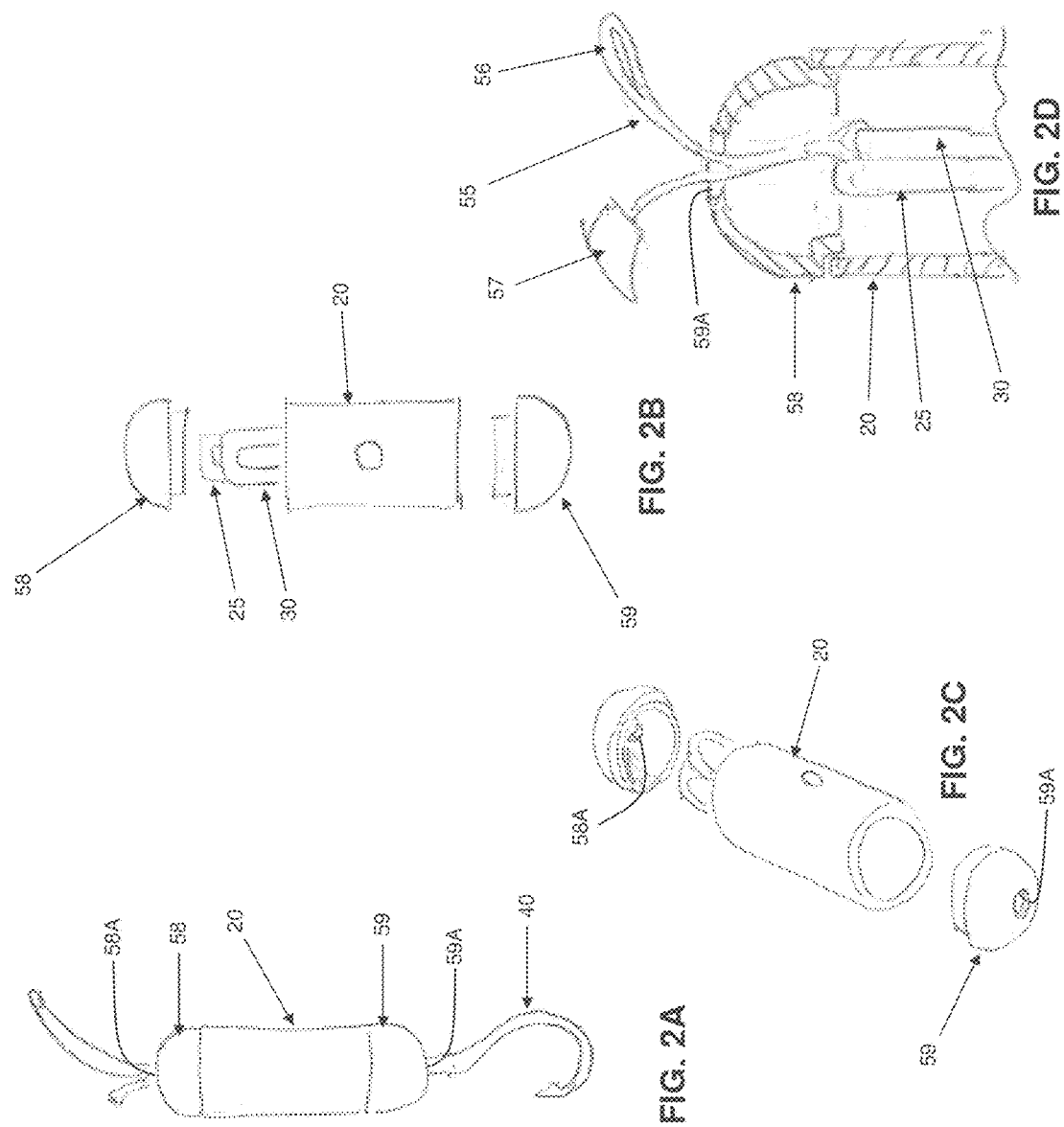

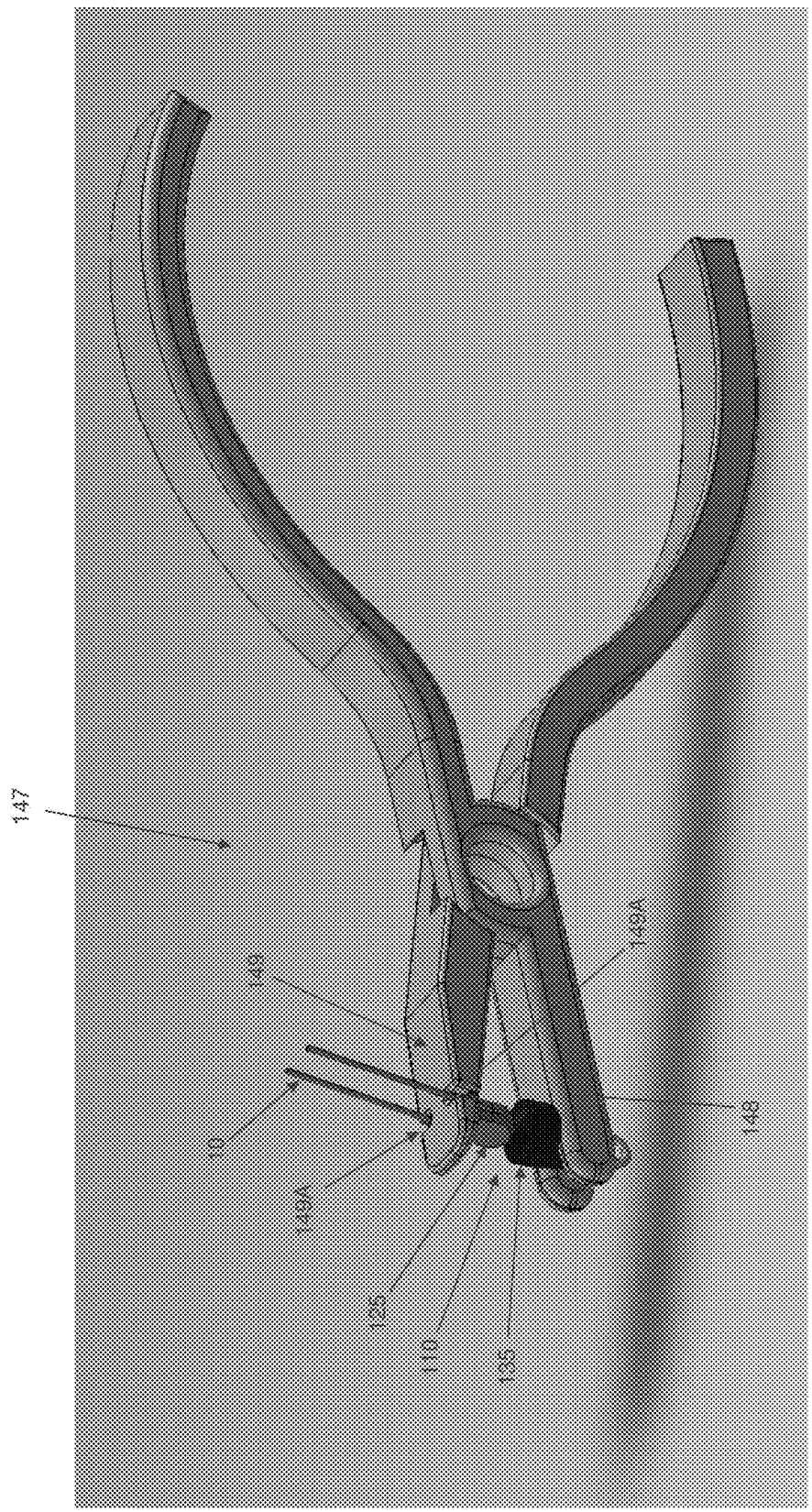

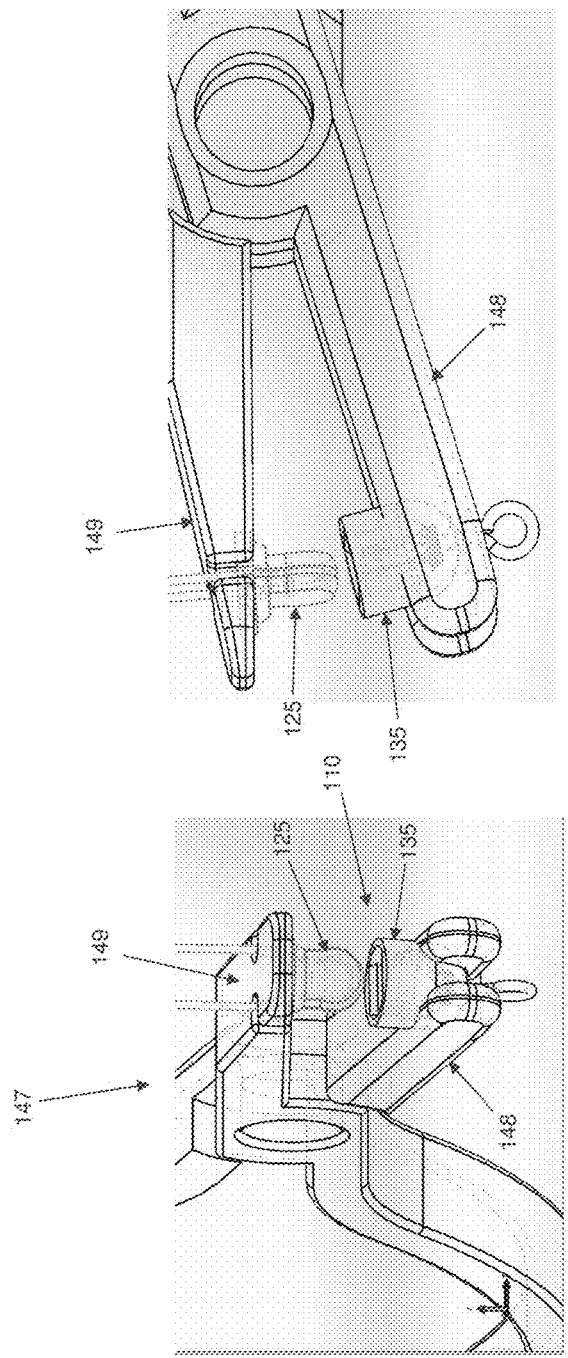
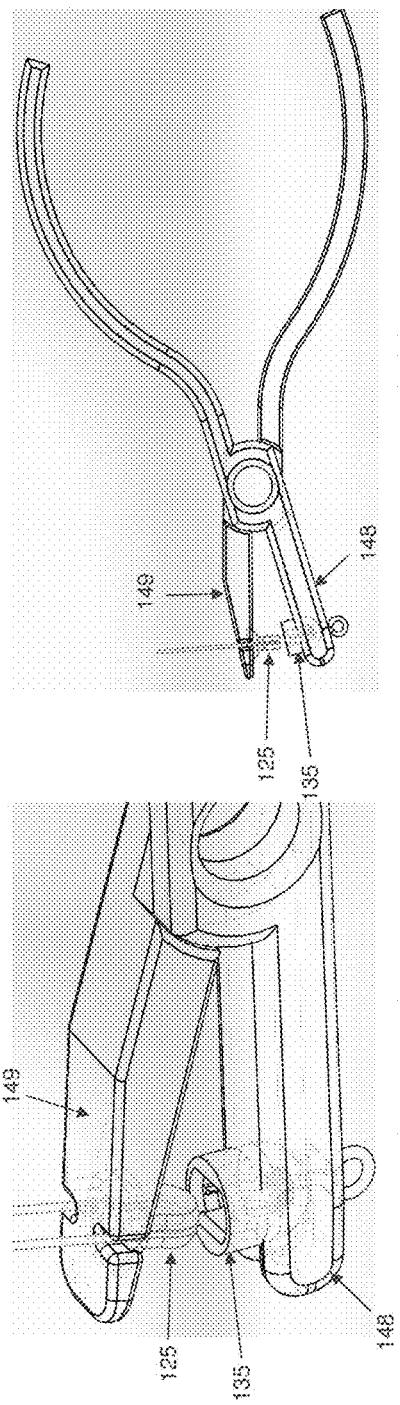
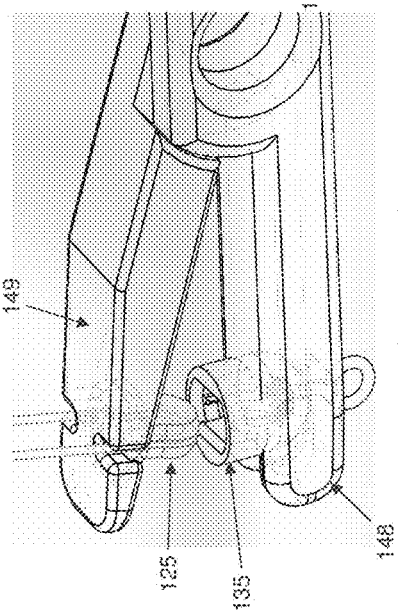

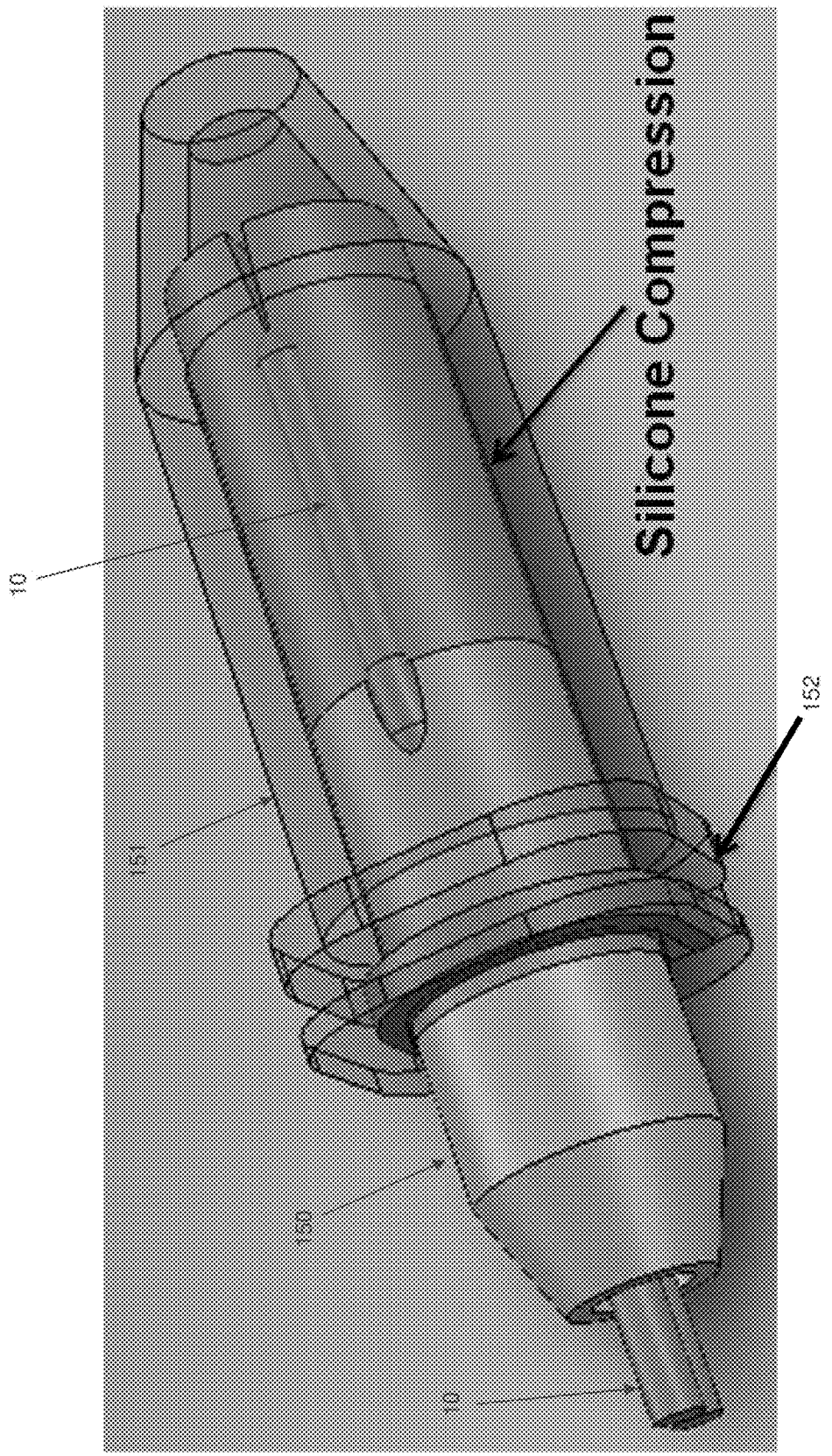

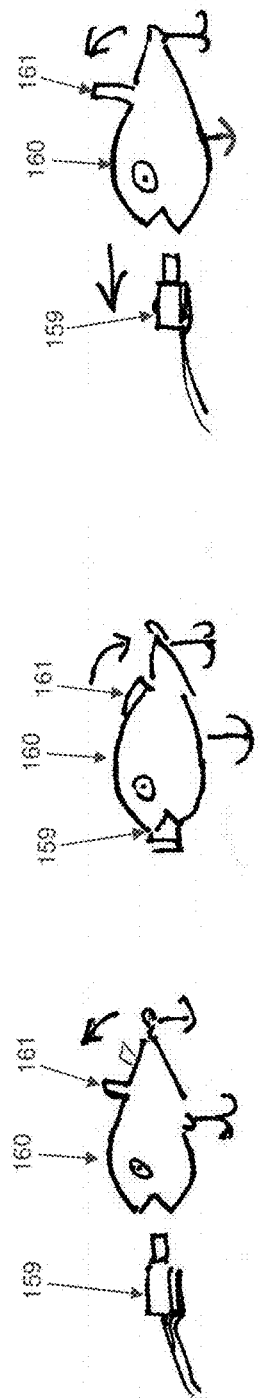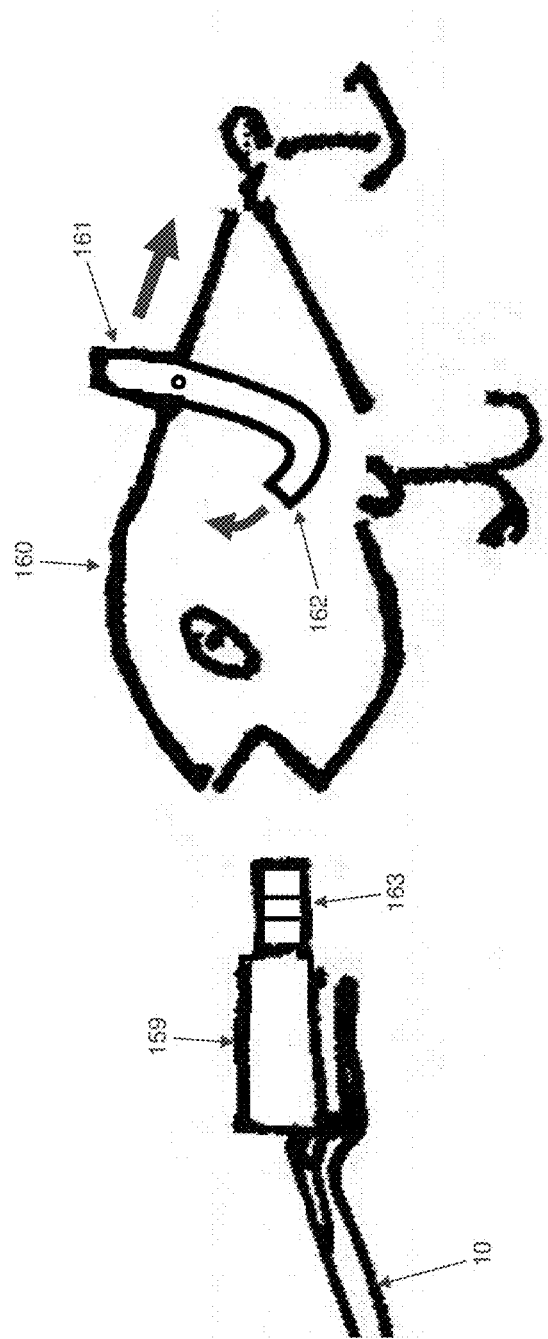
FIG. 15P
FIG. 15Q

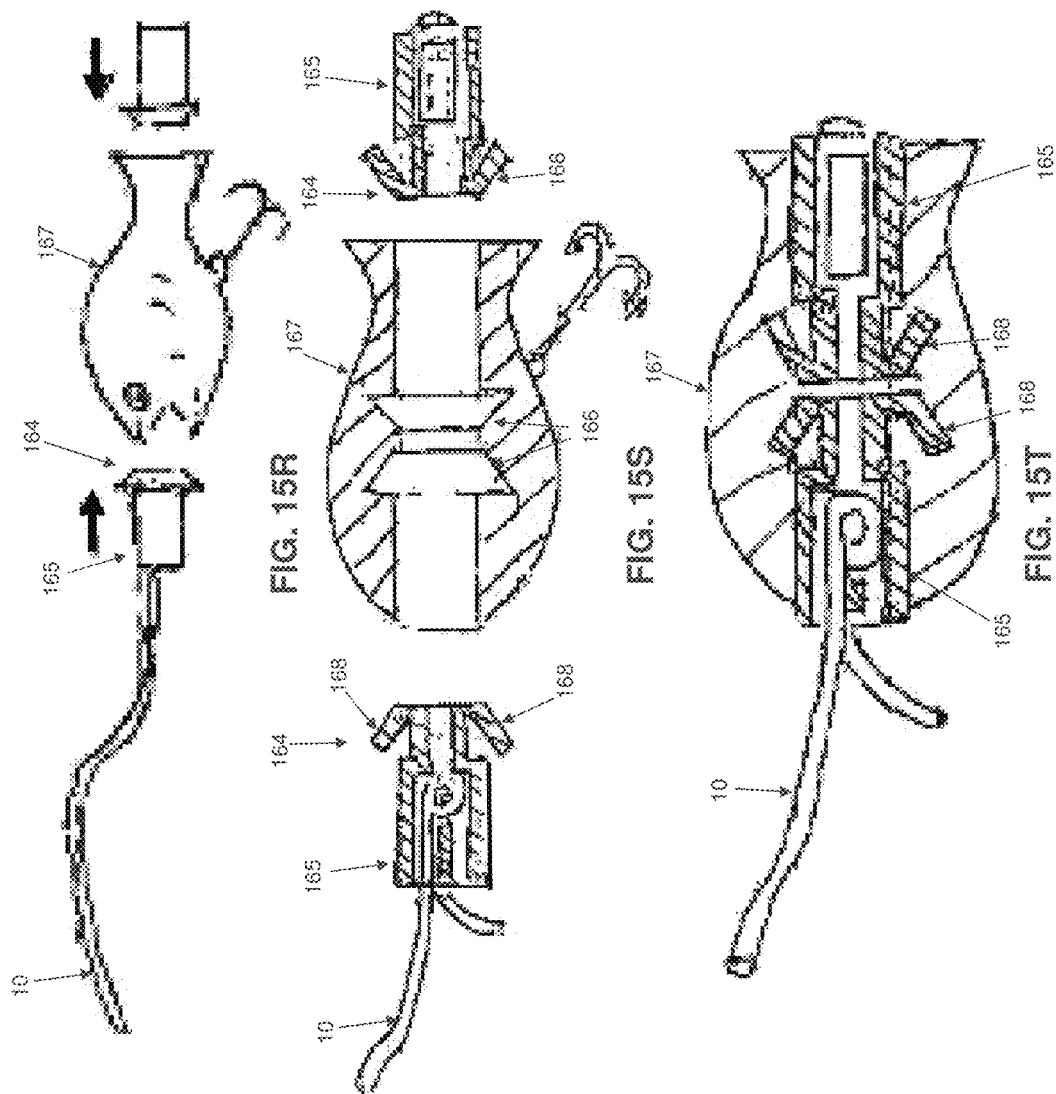

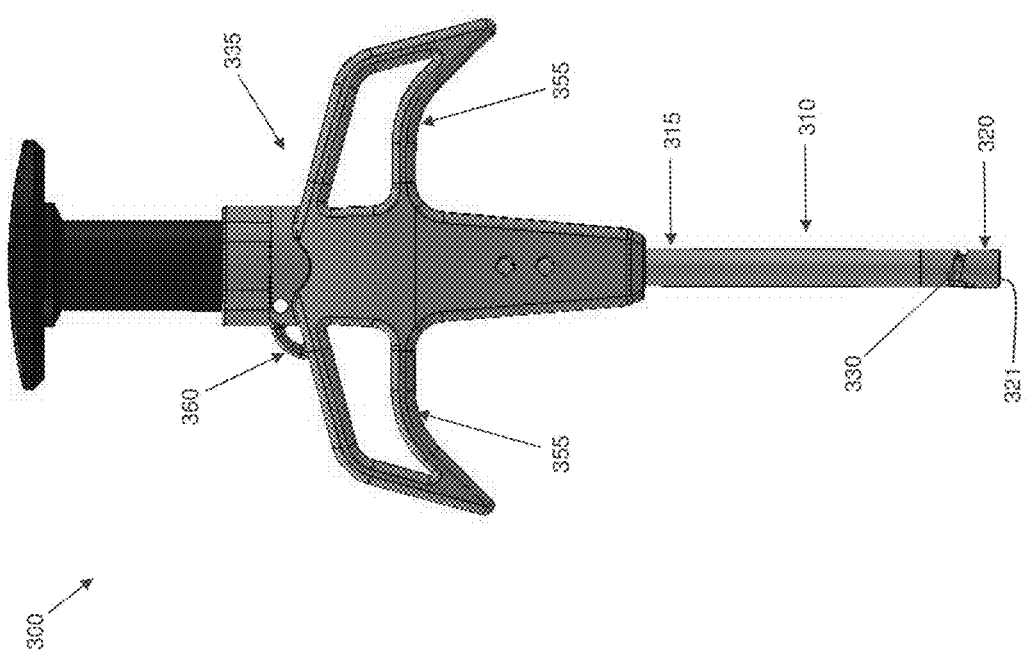

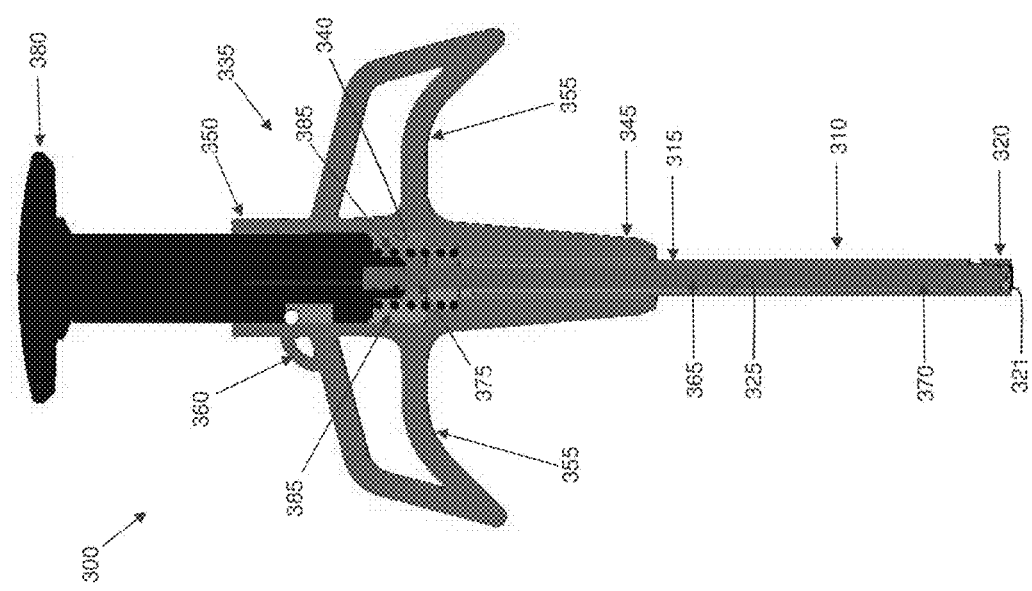

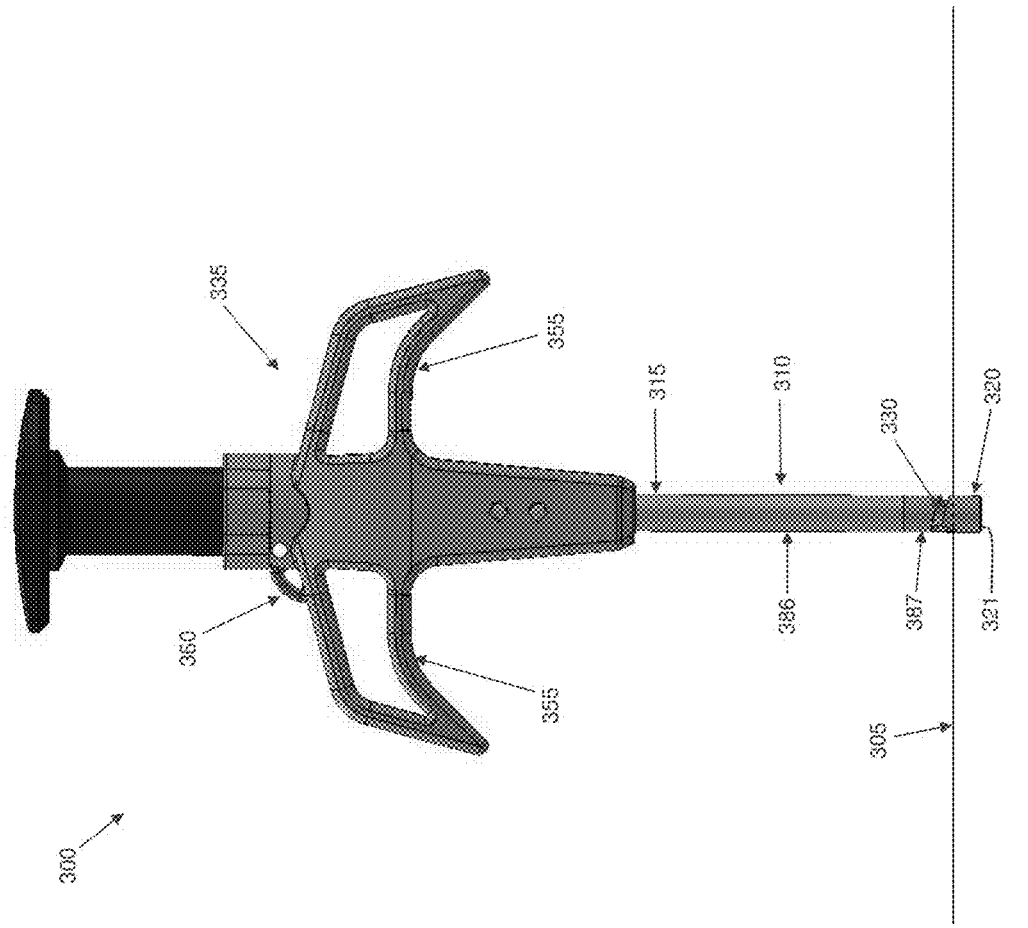

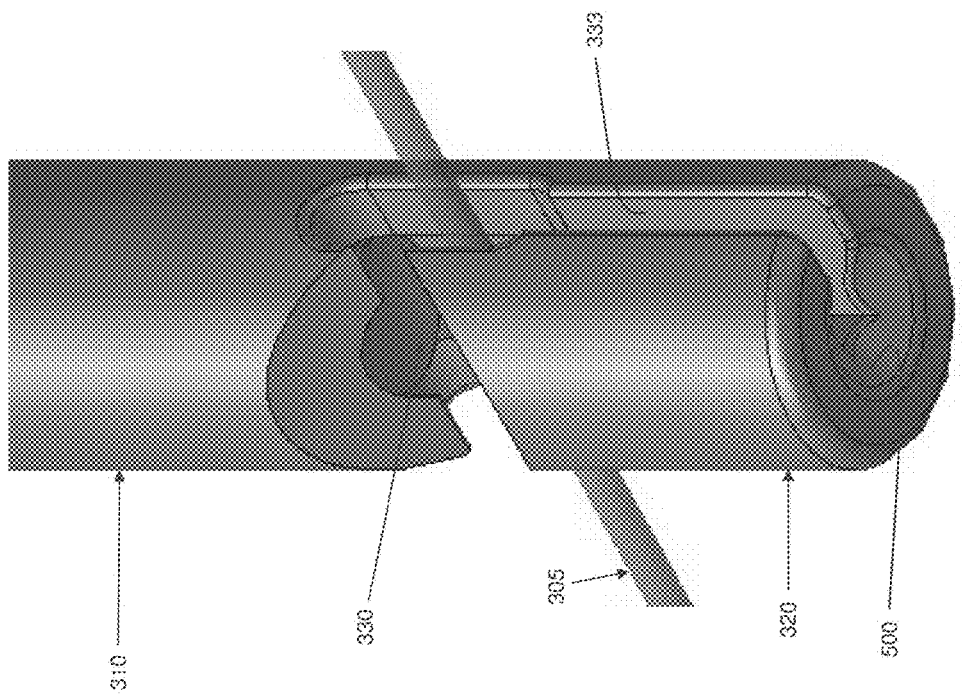

METHOD AND APPARATUS FOR JOINING A FISHING LINE TO ANOTHER FISHING COMPONENT, FOR ADJUSTING THE BUOYANCY OF FISHING COMPONENTS, AND FOR CUTTING A FISHING LINE

REFERENCE TO PENDING PRIOR PATENT APPLICATION

This patent application claims benefit of pending prior U.S. Provisional Patent Application Ser. No. 61/755,281, filed Jan. 22, 2013 by Kevin L. Ohashi et al. for METHOD AND APPARATUS FOR JOINING FISHING COMPONENTS.

The above-identified patent application is hereby incorporated herein by reference.

FIELD OF THE INVENTION

This invention relates generally to fishing, and more particularly to methods and apparatus for joining a fishing line to another fishing component, for adjusting the buoyancy of fishing components, and for cutting a fishing line.

BACKGROUND OF THE INVENTION

Recreational and commercial fishing frequently requires that a fishing line be joined to another fishing component, e.g., to a hook, to a lure, to a weight, to another fishing line, etc. The customary manner for effecting this joinder is by tying a knot in the fishing line, however, such knot-tying can be time-consuming and physically tiring, and/or can be difficult to effect in the dark and/or in cold or inclement weather conditions, and/or can create a "weak link" in the system (i.e., the knot may be weaker than the fishing line or the other fishing component which is being joined to the fishing line). In addition, where the fishing line is to be joined to another fishing line, it can be difficult to create a strong knot where the two fishing lines are of different sizes (e.g., where a large diameter fishing line is to be connected to a small diameter fishing line) and/or where the two fishing lines are of different compositions (e.g., where a monofilament fishing line is to be connected to a braided fishing line). In addition, knots can be bulky, and can affect fluid dynamics in water and aerodynamics in air.

For this reason, efforts have been made to use mechanical connectors (e.g., metal crimps) to join a fishing line to another fishing component, however, these mechanical connectors have generally proven unsatisfactory (e.g., they may be time-consuming to set, and/or they may be difficult to set reliably, particularly in the dark and/or in inclement weather conditions, and/or they may damage the fishing line, and/or they may have inferior holding strength, and/or they may be expensive, etc.). Where two monofilament fishing lines are to be joined, efforts have also been made to weld the two monofilament fishing lines together, but such welding has generally resulted in weakened line strength since welding disrupts the molecular arrays in the monofilament fishing lines, etc. In addition, such welding can be particularly problematic in harsh ocean conditions of the sort frequently encountered in commercial fishing endeavors.

As a result, it would be advantageous to have a new and improved method and apparatus for joining a fishing line to another fishing component (including another fishing line) which does not suffer from the deficiencies of the prior art.

In addition, it would also be advantageous to have a new and improved method and apparatus for adjusting the buoyancy of fishing components.

And it would also be advantageous to have a new and improved method and apparatus for cutting a fishing line.

SUMMARY OF THE INVENTION

The present invention provides a new and improved method and apparatus for joining a fishing line to another fishing component (including another fishing line) which does not suffer from the deficiencies of the prior art.

More particularly, the present invention comprises the provision and use of a novel mechanical connector which can be used to quickly, easily and reliably join a fishing line to another fishing component (e.g., to a hook, to a lure, to a weight, to another fishing line, etc.) without requiring the tying of knots, the use of metal crimps, the welding of fishing line, etc. The present invention is particularly well suited to joining one fishing line to another fishing line, and can create a strong joinder even where the two fishing lines are of different sizes (e.g., where a large diameter fishing line is to be connected to a small diameter fishing line) and/or where the two fishing lines are of different compositions (e.g., where a monofilament fishing line is to be connected to a braided fishing line).

The present invention also provides a novel method and apparatus for adjusting the buoyancy of fishing components.

And the present invention provides a novel method and apparatus for cutting a fishing line.

In one preferred form of the present invention, there is provided a connector for joining a first fishing component to a second fishing component, said connector comprising:

a body; and a cinch mechanism secured to said body, said cinch mechanism comprising a first loop fixedly secured to said body and a second loop slidably secured to said body.

In another preferred form of the present invention, there is provided a novel method for joining a first fishing component to a second fishing component, said method comprising:

providing a connector comprising:
a body; and
a cinch mechanism secured to said body, said cinch mechanism comprising a first loop fixedly secured to said body and a second loop slidably secured to said body; and weaving the first fishing component through said first loop, through said second loop, and back through said first loop, and tensioning the first fishing component, and securing the second fishing component to said body.

In another preferred form of the present invention, there is provided a connector for joining a first fishing component to a second fishing component, the connector comprising:

a first body comprising a cavity;

a second body for receipt within said cavity;

at least one of said first body and said second body being formed of a resilient material, and said first body and said second body being configured so that said second body makes a press-fit within said first body;

means for positioning the first fishing component between said first body and said second body so that the first fishing component is captured between said first body and said second body when said second body is press-fit within said first body; and means for securing the second fishing component to said first body.

In another preferred form of the present invention, there is provided a method for joining a first fishing component to a second fishing component, said method comprising:
  providing a connector comprising:
  a first body comprising a cavity;
  a second body for receipt within said cavity;
  at least one of said first body and said second body being formed of a resilient material, and said first body and said second body being configured so that said second body makes a press-fit within said first body;
  means for positioning the first fishing component between said first body and said second body so that the first fishing component is captured between said first body and said second body when said second body is press-fit within said first body; and
  means for securing the second fishing component to said first body;
  positioning the first fishing component between said first body and said second body, and positioning said second body within said cavity in said first body so as to capture said first fishing component between said first body and said second body, and securing the second fishing component to said body.

In another preferred form of the present invention, there is provided fishing apparatus comprising:
  a lure;
  a fishing line; and
  a connector for mounting said fishing line to said lure, said connector comprising means for knotlessly connecting said fishing line to said connector, and means for knotlessly connecting said connector to said lure.

In another preferred form of the present invention, there is provided a method for connecting a fishing line to a lure, the method comprising:
  knotlessly connecting the fishing line to a connector; and
  knotlessly connecting said connector to said lure.

In another preferred form of the present invention, there is provided apparatus for connecting a first fishing line to a second fishing line, the apparatus comprising:
  a body having a first opening for passing the first fishing line between a first rigid portion of the body and a first resilient portion of the body, wherein the first resilient portion of the body is capable of flexing away from said first rigid portion of the body, whereby to permit the first fishing line to move in a first direction relative to said body but prevent the first fishing line from moving in a second direction relative to said body, and a second opening for passing the second fishing line between a second rigid portion of the body and a second resilient portion of the body, wherein the second resilient portion of the body is capable of flexing away from said second rigid portion of the body, whereby to permit the second fishing line to move in a first direction relative to said body but prevent the second fishing line from moving in a second direction relative to said body.

In another preferred form of the present invention, there is provided a method for connecting a first fishing line to a second fishing line, the method comprising:
  providing a body having a first opening for passing the first fishing line between a first rigid portion of the body and a first resilient portion of the body, wherein the first resilient portion of the body is capable of flexing away from said first rigid portion of the body, whereby to permit the first fishing line to move in a first direction relative to said body but prevent the first fishing line from moving in a second direction relative to said body, and a second opening for passing the second fishing line between a second rigid portion of the body and a second resilient portion of the body, wherein the second resilient portion of the body is capable of flexing away from said second rigid portion of the body, whereby to permit the second fishing line to move in a first direction relative to said body but prevent the second fishing line from moving in a second direction relative to said body; and
  passing the first fishing line through said first opening, passing said second fishing line through said second opening, and applying tension to the first fishing line and the second fishing line.

In another preferred form of the present invention, there is provided a connector for joining a first fishing component to a second fishing component, the connector comprising:
  a first body comprising a first cavity and a second cavity;
  a second body formed of a resilient material for making a press-fit within said first cavity; and
  a third body formed of a resilient material for making a press-fit within said second cavity;
  means for positioning the second fishing component relative to said second body so that the second fishing component is captured to said second body when said second body is press-fit within said first cavity; and
  means for positioning the second fishing component relative to said third body so that the second fishing component is captured to said third body when said third body is press-fit within said second cavity.

In another preferred form of the present invention, there is provided a method for joining a first fishing component to a second fishing component, the method comprising:
  providing a connector comprising:
  a first body comprising a first cavity and a second cavity;
  a second body formed of a resilient material for making a press-fit within said first cavity; and
  a third body formed of a resilient material for making a press-fit within said second cavity;
  means for positioning the second fishing component relative to said first body so that the second fishing component is captured to said second body when said second body is press-fit within said first cavity; and
  means for positioning the second fishing component relative to said third body so that the second fishing component is captured to said third body when said third body is press-fit within said second cavity;
  positioning the second fishing component relative to said second body and positioning said second body in said first cavity so that the second fishing component is captured to said second body; and
  positioning the second fishing component relative to said third body and positioning said third body in said second cavity so that the second fishing component is captured to said second body.

In another preferred form of the present invention, there is provided apparatus for adjusting the buoyancy of a fishing component, the apparatus comprising:
  a fishing line having the fishing component secured thereto;
  an expandable float connected to said fishing line; and
  means for inflating and deflating said expandable float.

In another preferred form of the present invention, there is provided a method for adjusting the buoyancy of a fishing component, the method comprising:
  providing apparatus comprising:
  a fishing line having the fishing component secured thereto;
  an expandable float connected to said fishing line; and means for inflating and deflating said expandable float; and inflating or deflating said expandable float.

In another preferred form of the present invention, there is provided apparatus for cutting a fishing line, said apparatus comprising:

a hollow shaft having a proximal end, a distal end, and a lumen extending therebetween;

a slot formed in said hollow shaft and communicating with said lumen; and a cutter shaft movably disposed within said lumen so as to selectively cross said slot, whereby to cut a fishing line disposed in said slot.

In another preferred form of the present invention, there is provided a method for cutting a fishing line, the method comprising:

providing apparatus comprising:
a hollow shaft having a proximal end, a distal end, and a lumen extending therebetween;
a slot formed in said hollow shaft and communicating with said lumen; and
a cutter shaft movably disposed within said lumen so as to selectively cross said slot, whereby to cut a fishing line disposed in said slot;

positioning a fishing line in said slot; and moving the cutter shaft within said lumen so as to cross said slot, whereby to cut the fishing line.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 2A-2D are schematic views showing how rounded end caps may be provided on the distal and proximal ends of the connector shown in FIG. 1 so as to facilitate passage of the connector through restricted spaces;

FIGS. 15A-15I show a pliers tool which may be used to set the novel connector shown in FIGS. 8-15;

FIG. 15J is a perspective view showing a novel connector that may be incorporated into a lure or other fishing component so as to facilitate attachment of a fishing line to the lure or other fishing component without requiring the tying of a knot;

FIGS. 15P and 15Q are schematic views showing another novel connector that may be inserted into, or pre-attached to, a lure or other fishing component so as to facilitate attachment of a fishing line to the lure or other fishing component without requiring the tying of a knot;

FIGS. 15R-15V are schematic views showing another novel connector that may be inserted into, or pre-attached to, a lure or other fishing component so as to facilitate attachment of a fishing line to the lure or other fishing component without requiring the tying of a knot;

FIGS. 22-27 are schematic views showing a novel fishing line cutter for cutting a fishing line, e.g., after the fishing line has been secured to a novel connector of the type disclosed herein;

FIG. 30 is a schematic view showing another modified form of the fishing line cutter shown in FIGS. 22-27.

DETAILED DESCRIPTION OF THE PREFERRED EMBODIMENTS

Method and Apparatus for Joining a Fishing Line to Another Fishing Component

Figure 1:
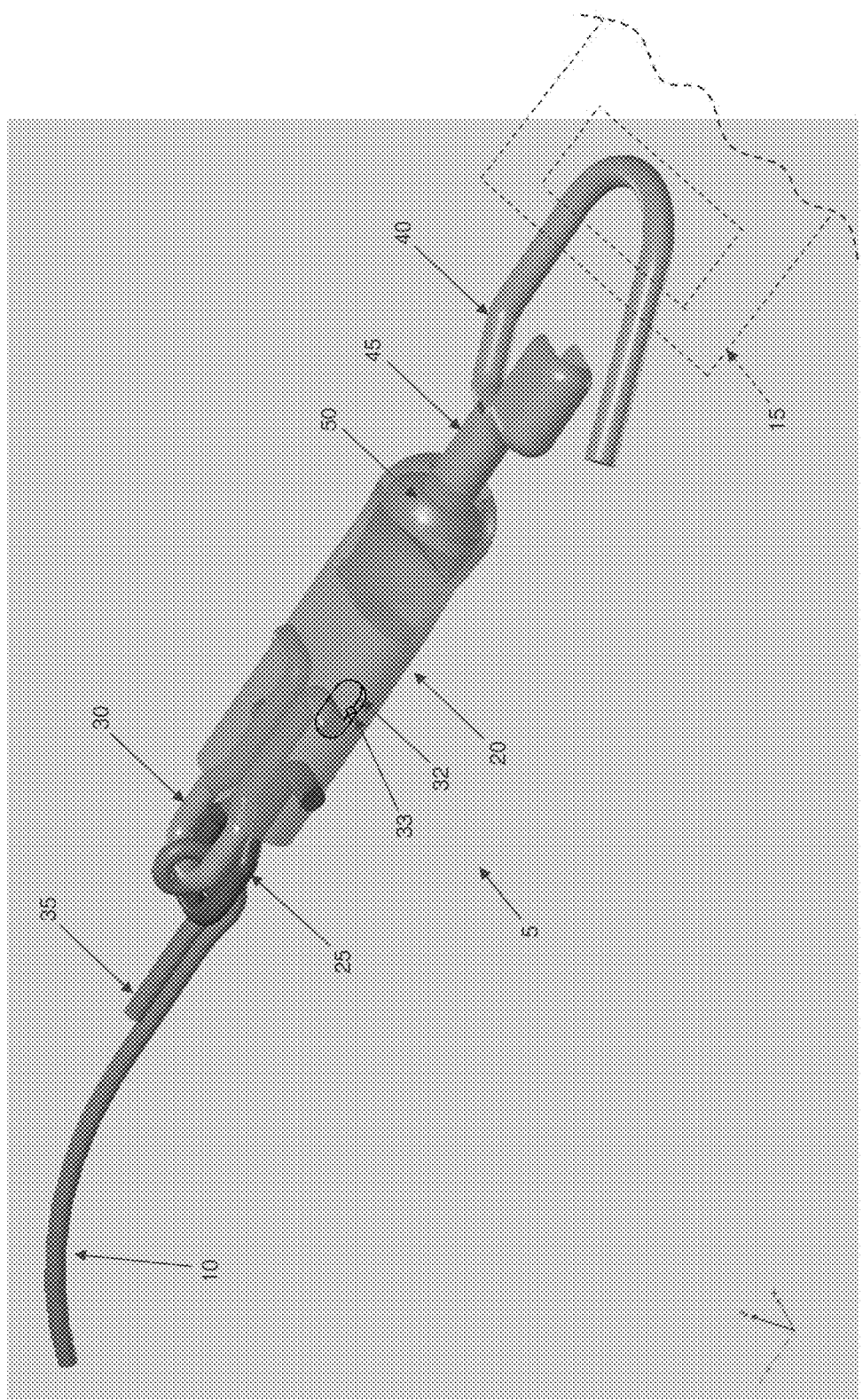
FIG. 1 is a schematic view showing a novel connector for connecting a fishing line to another fishing component (e.g., a hook, a lure, a weight, etc.)

Looking first at FIG. 1, there is shown a novel connector 5 for connecting a fishing line 10 to another fishing component 15 (e.g., a hook, a lure, a weight, another fishing line, etc.). Connector 5 generally comprises a body 20 having a first loop 25 fixedly secured thereto and a second loop 30 slidably secured thereto. Body 20, first loop 25 and second loop 30 are preferably formed out of a substantially rigid material, e.g., stainless steel, hard plastic, etc. In one preferred form of the invention, second loop 30 is slidably disposed in a pair of diametrically-opposed slots 32 (only one of which is visible in FIG. 1) formed in body 20, whereby second loop 30 can move longitudinally relative to body 20 (and hence can move longitudinally relative to first loop 25). If desired, a dimple 33 may project into slot 32 so as to provide a ratchet effect for movement of second loop 30 relative to body 20 (and hence relative to first loop 25). First loop 25 and second loop 30 together essentially comprise a cinch mechanism of the sort disclosed in U.S. Pat. No. 7,938,847, issued May 10, 2011 to Gary S. Fanton et al. for RING CINCH ASSEMBLY TO ATTACH BONE TO TISSUE, which patent is hereby incorporated herein by reference. More particularly, by threading fishing line 10 through first loop 25, through second loop 30 and then back through first loop 25 in the manner shown in FIG. 1, and by thereafter pulling on the free end 35 of fishing line 10, second loop 30 can be brought together with first loop 25 so as to bind fishing line 10 to connector 5. In this way, fishing line 10 can be knotlessly secured to connector 5. Connector 5 also comprises a spring clip 40 for releasably securing fishing component 15 (e.g., a hook, a lure, a weight, another fishing line, etc.) to connector 5 (and hence to fishing line 10). Preferably spring clip 40 is rotatably mounted to body 20 via a shaft 45 and a swivel mechanism 50.

Figure 2:
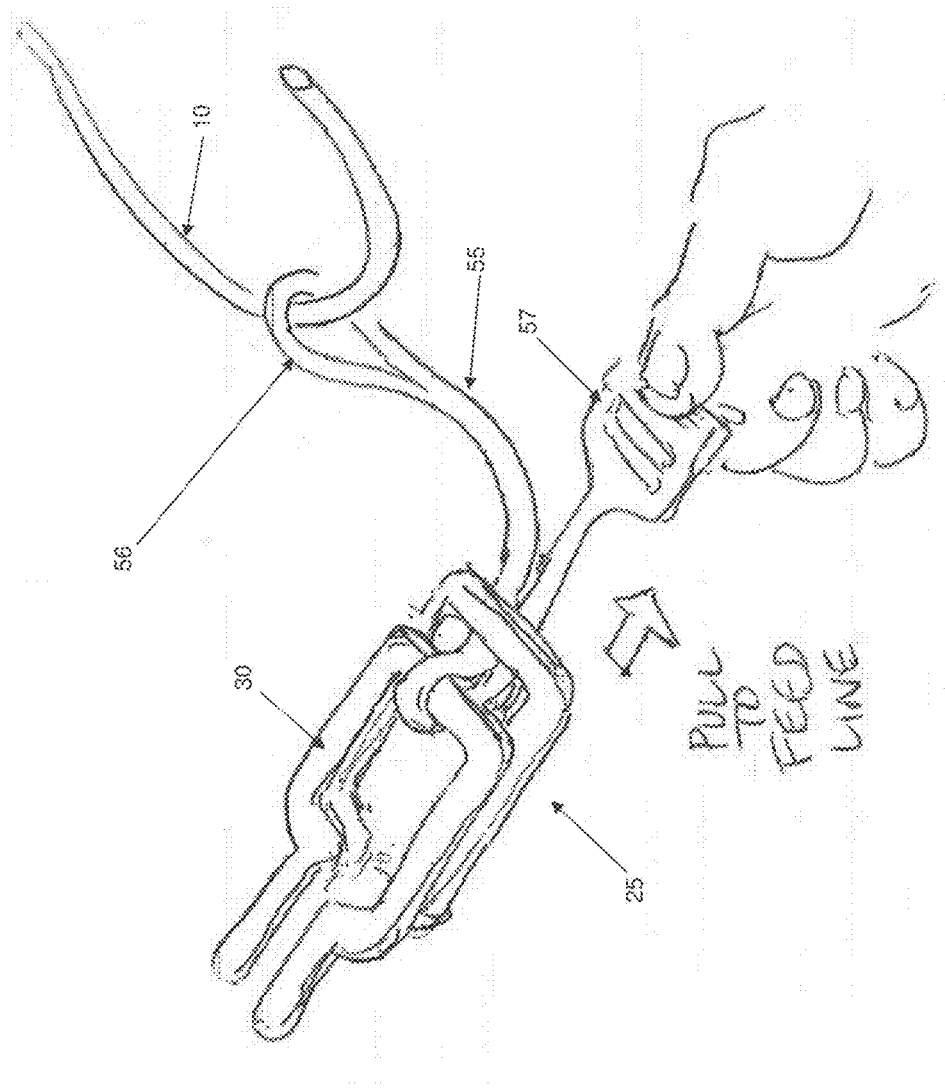
FIG. 2 is a schematic view showing a threader which may be used to thread a fishing line through the novel connector shown in FIG. 1.

If desired, and looking now at FIG. 2, a threader 55 (comprising a feed loop 56 and a pull tab 57) may be provided for threading fishing line 10 through first loop 25, through second loop 30 and then back through first loop 25 of connector 5 so as to quickly and easily connect fishing line 10 to connector 5. By way of example but not limitation, threader 55 may be pre-loaded onto connector 5 (e.g., at the factory) so that, in the field, fishing line 10 may be quickly and easily threaded through first loop 25, through second loop 30 and then back through first loop 25 of connector 5 so as to quickly and easily connect fishing line 10 to connector 5.

If desired, and looking now at FIGS. 2A-2D, rounded end caps may be provided on the distal and proximal ends of connector 5 so as to facilitate passage of the connector through restricted spaces, e.g., through the fishing line holder rings of a fishing pole, or through the fishing line inlet guide to a reel, etc. By way of example but not limitation, and still looking now at FIGS. 2A-2D, a proximal end cap 58 can cover the proximal end of connector 5 (i.e., first loop 25 and second loop 30) and a distal end cap 59 can cover the distal end of connector 5. By way of further example but not limitation, a hole 58A may be formed in proximal end cap 58 and a hole 59A may be formed in distal end cap 59, whereby to permit passage of fishing line 10 and/or shaft 45 of spring clip 40 through proximal end cap 58 and distal end cap 59, respectively.

Figure 2E:
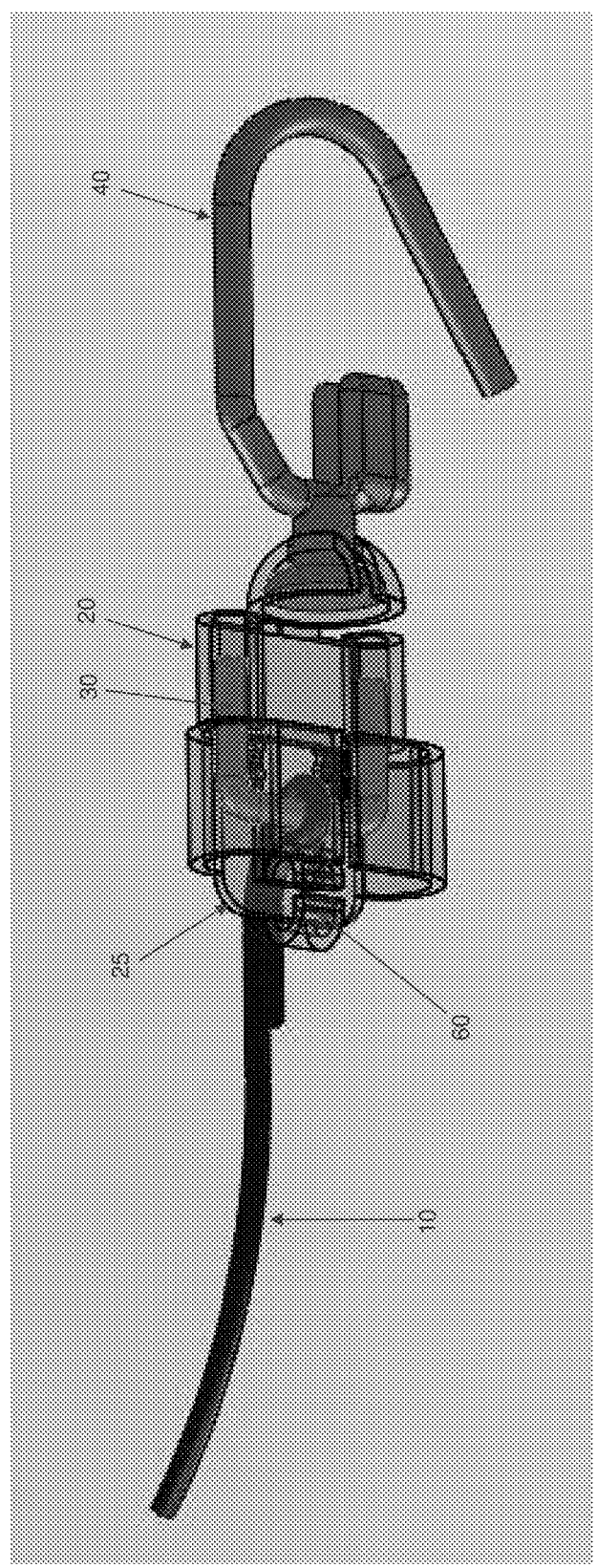
FIG. 2E is a schematic view showing how the configuration of the connector shown in FIG. 1 may be modified if desired.

FIG. 2E is a schematic view showing how, if desired, the geometry of connector 5 (e.g., the geometry of body 20) may be modified from that shown in FIGS. 1 and 2A-2D. FIG. 2E also shows how, if desired, first loop 25 may comprise a textured surface (e.g., a grooved surface) 60 for enhanced gripping of fishing line 10.

Figure 3:
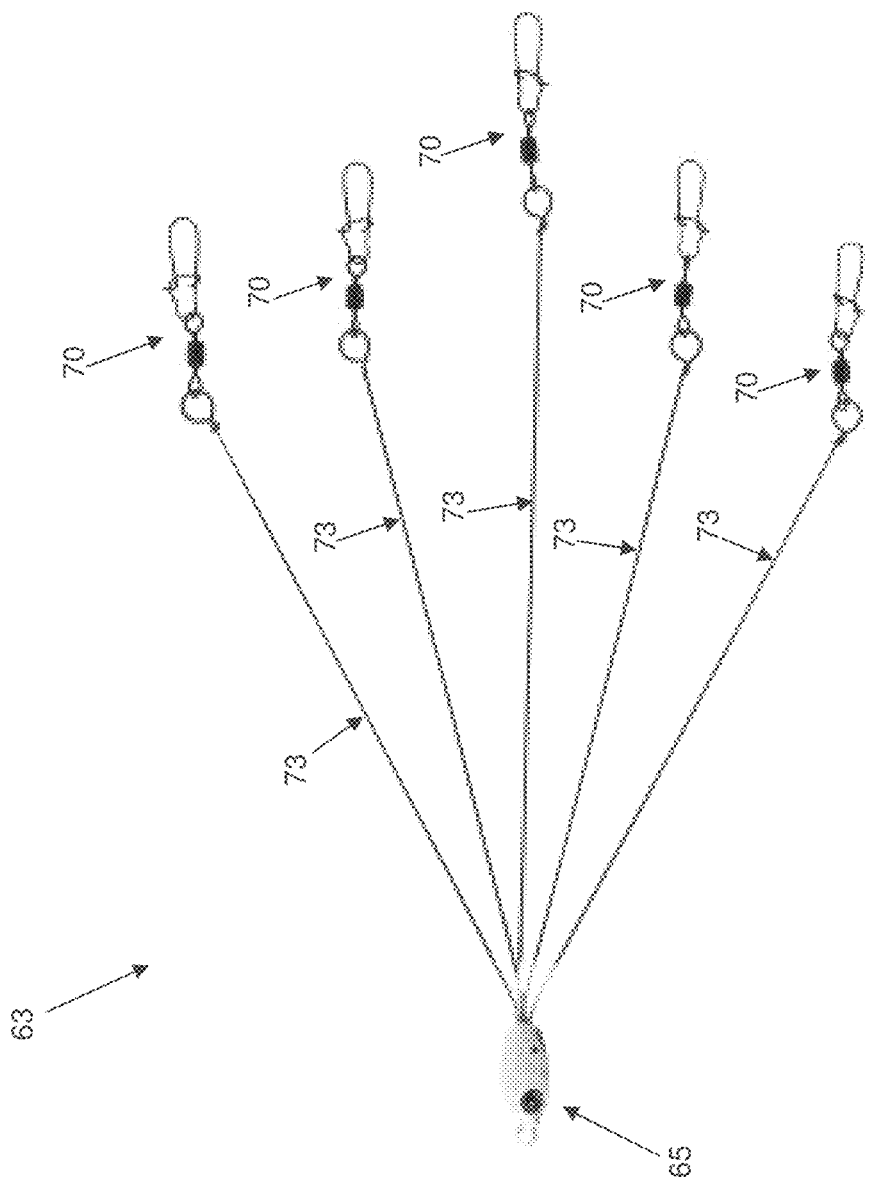
FIG. 3 is a schematic view showing a multiplier which may be used to connect multiple fishing components to the novel connector shown in FIG. 1.

If desired, a multiplier may be used to connect multiple fishing components 15 to a single connector 5. More particularly, and looking now at FIG. 3, a multiplier 63 comprises a lead element 65 and a plurality of trailing elements 70 connected to lead element 65 via connecting lines 73, with lead element 65 being connected to spring clip 40 of connector 5 (FIG. 1) and the multiple fishing components 15 being connected to each of the trailing elements 70. In this way, one connector 5 can be used to connect multiple fishing components 15 to a single fishing line.

Figure 4:
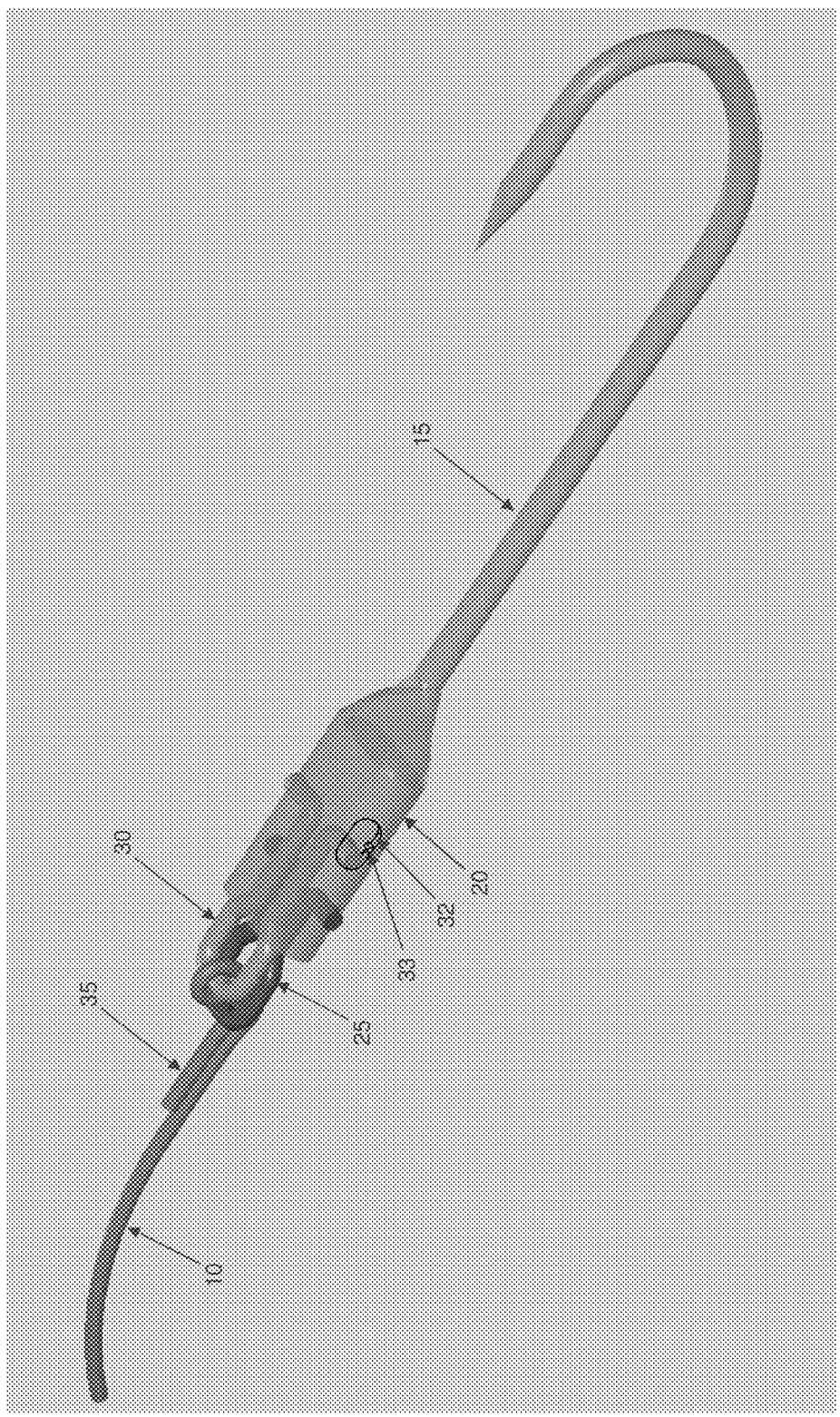
FIG. 4 is a schematic view showing how the novel connector shown in FIG. 1 may be integrated into a fishing component (e.g., into a hook) so as to provide an integrated construction.

In another form of the invention, body 20 of connector 5 (including first loop 25 and a second loop 30 of the aforementioned cinch mechanism) can be formed integral with the fishing component 15 (e.g., formed integral with the hook shown in FIG. 4, or a lure) such that the fishing line 10 can be knotlessly secured to the fishing component (e.g., the hook, lure, etc.) by appropriately threading fishing line 10 through first loop 25 and second loop 30 and then pulling on the free end 35 of the fishing line so as to bind the fishing component 15 (e.g., the hook, lure, etc.) to fishing line 10 via the aforementioned cinch mechanism.

In a further embodiment of the invention, the body 20 of connector 5 may incorporate arms, teeth, or other locking components such that, when inserted into a hook, lure, weight, or other component, it locks in place, thereby allowing pre-attached fishing line-to-connector assemblies to be inserted into, and locked (either permanently or removably) to, the hook, lure, weight, or other component.

Figure 5:
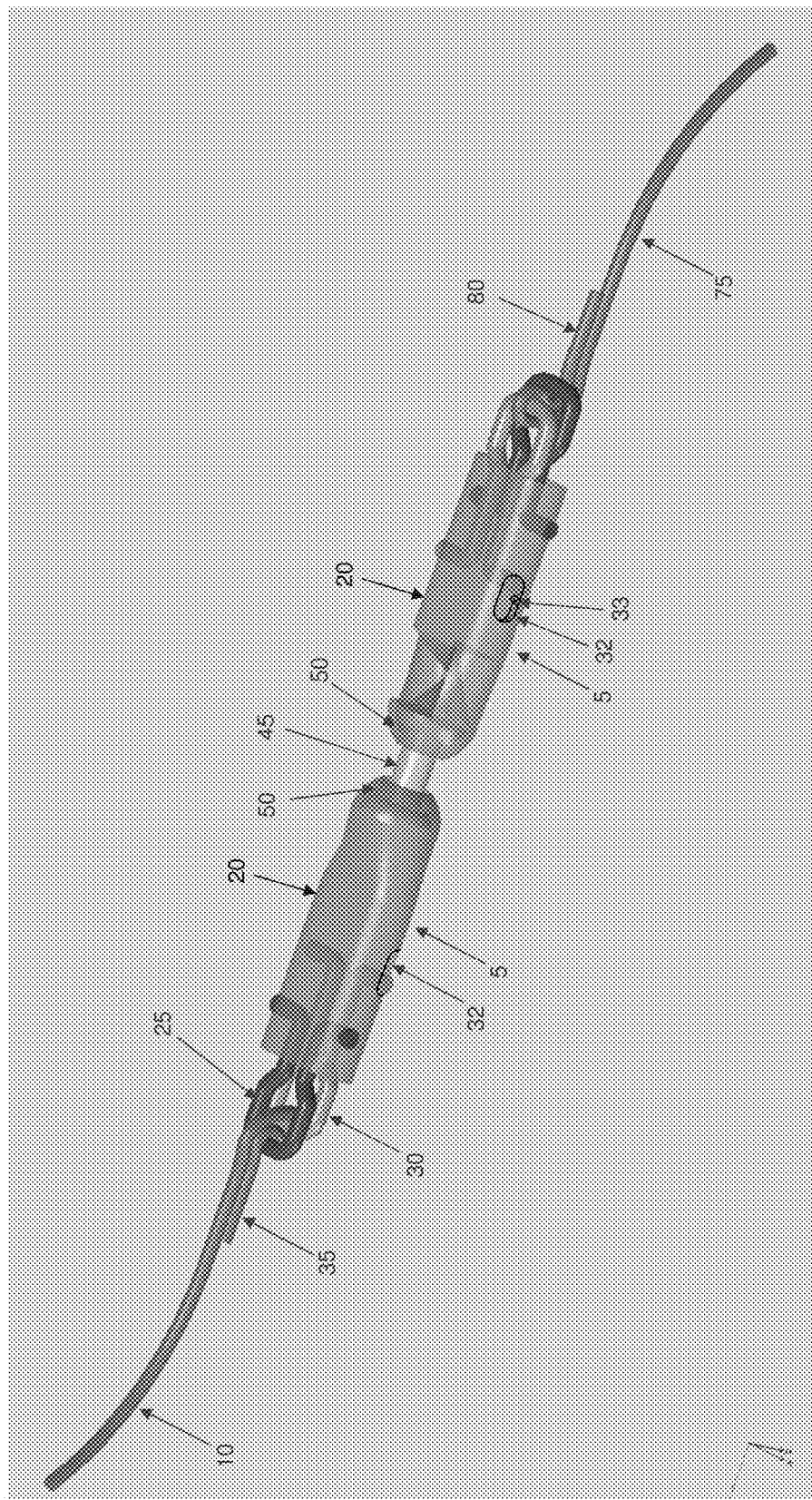
FIG. 5 is a schematic view showing a novel connector for connecting one fishing line to another fishing line.

If desired, and looking now at FIG. 5, two connectors 5 may be combined together so as to knotlessly connect a first fishing line 10 to a second fishing line 75. In this form of the invention, a common shaft 45 terminates in a pair of swivel mechanisms 50, with each swivel mechanism 50 retained in the body 20 of a connector 5, so as to link one connector 5 to the other connector 5. In this form of the invention, by appropriately threading fishing line 10 through first loop 25 and through second loop 30 of one connector 5, and by appropriately threading second fishing line 75 through first loop 25 and through second loop 30 of the other connector 5, and then pulling on free end 35 of fishing line 10 and pulling on free end 80 of second fishing line 75, fishing line 10 can be knotlessly secured to second fishing line 75.

Figure 5A:
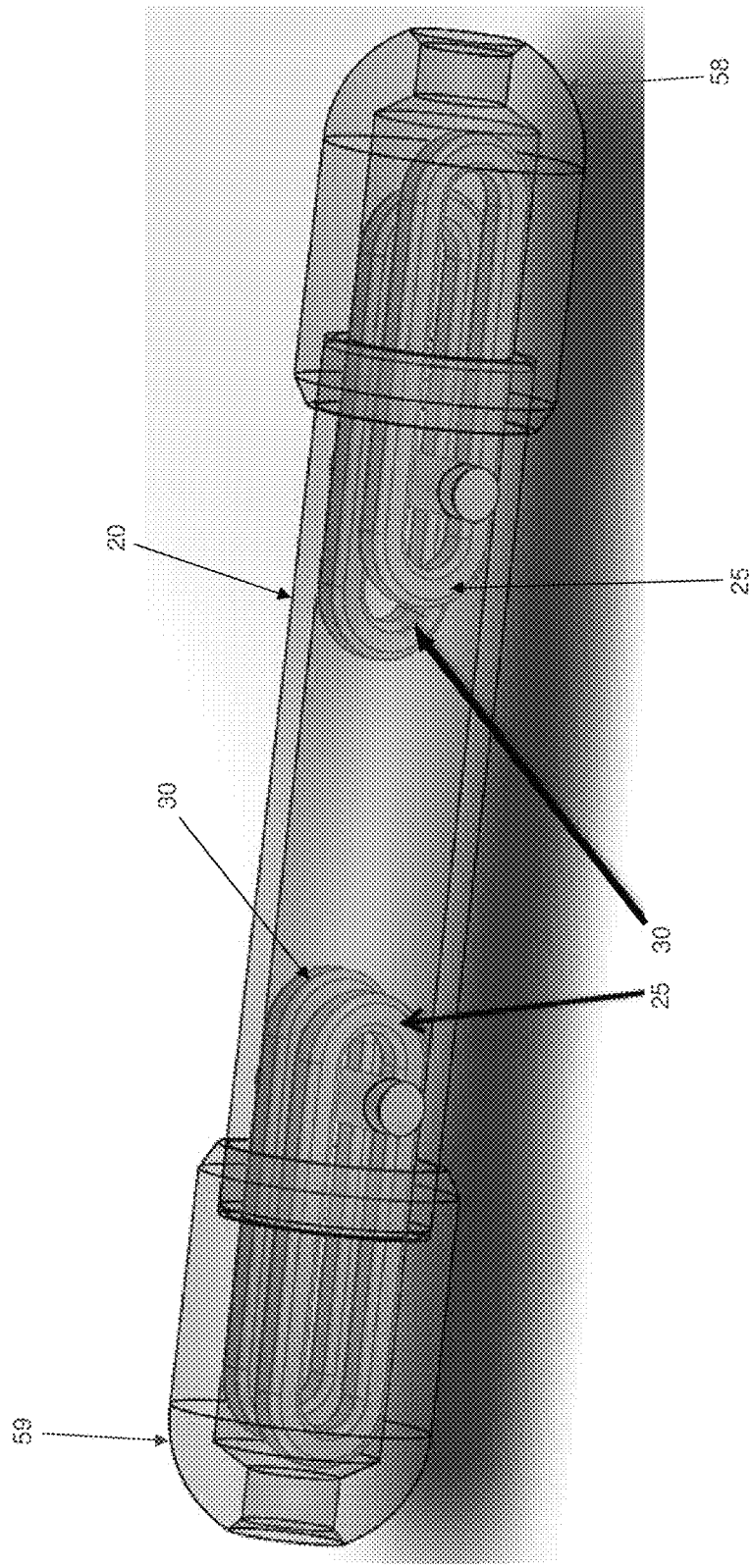
FIG. 5A is a perspective view showing a connector generally similar to the novel connector shown in FIG. 5, except that it comprises a single rigid body and is provided with rounded end caps so as to facilitate passage of the connector through restricted spaces.

In another preferred form of the present invention, and looking now at FIG. 5A, connector 5 can be used to knotlessly connect a first fishing line to a second fishing line without requiring the use of multiple connectors 5. More particularly, this form of the invention is generally similar to the embodiment shown in FIG. 5, except that shaft 45 and swivel mechanisms 40 are omitted and body 20 houses a pair of cinch mechanisms, one cinch mechanism at each end of body 20, where each cinch mechanism comprises a first loop 25 and a second loop 30.

Figure 6:
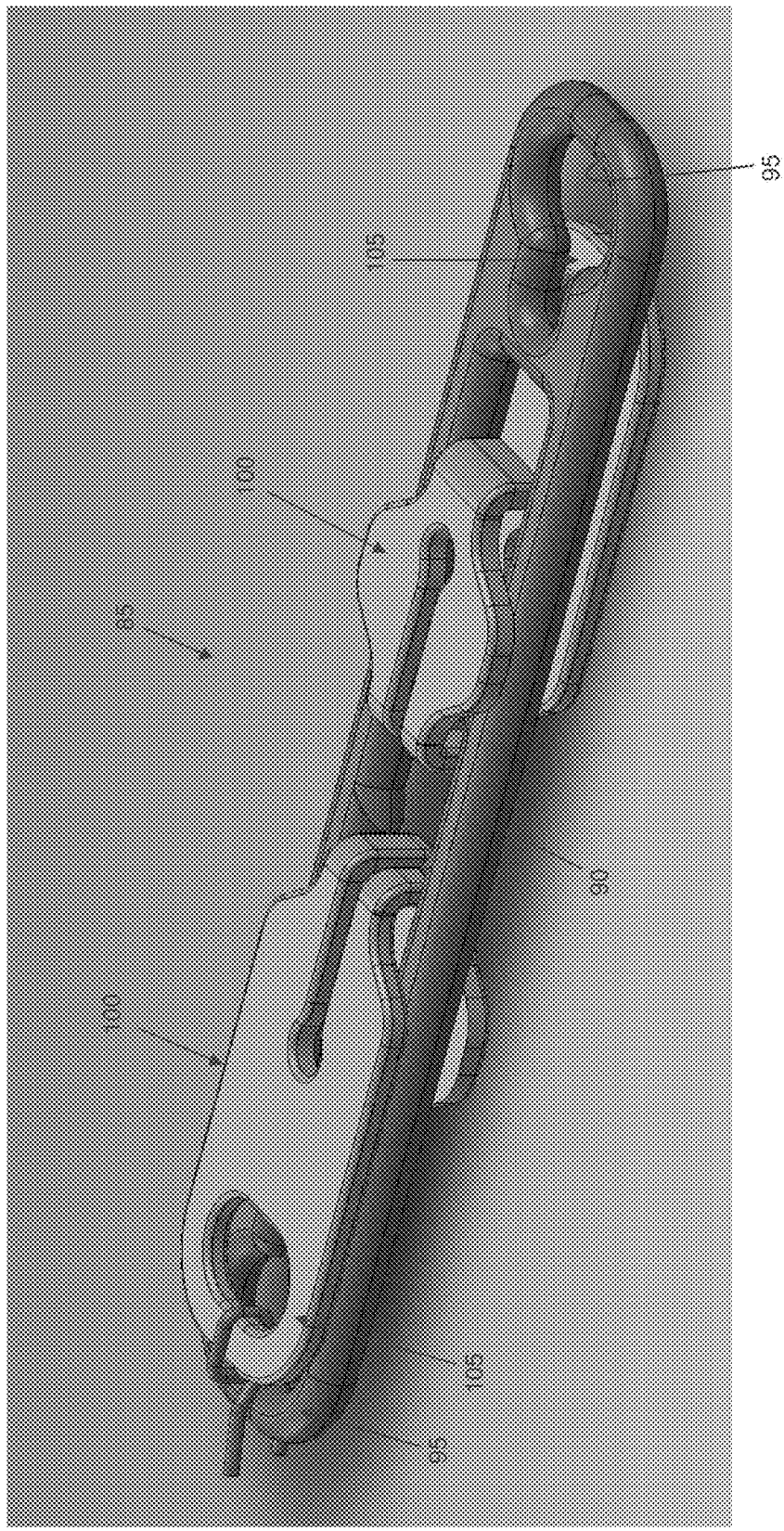
FIGS. 6 and 7 are schematic views showing another novel connector for connecting one fishing line to another fishing line.
Figure 7:
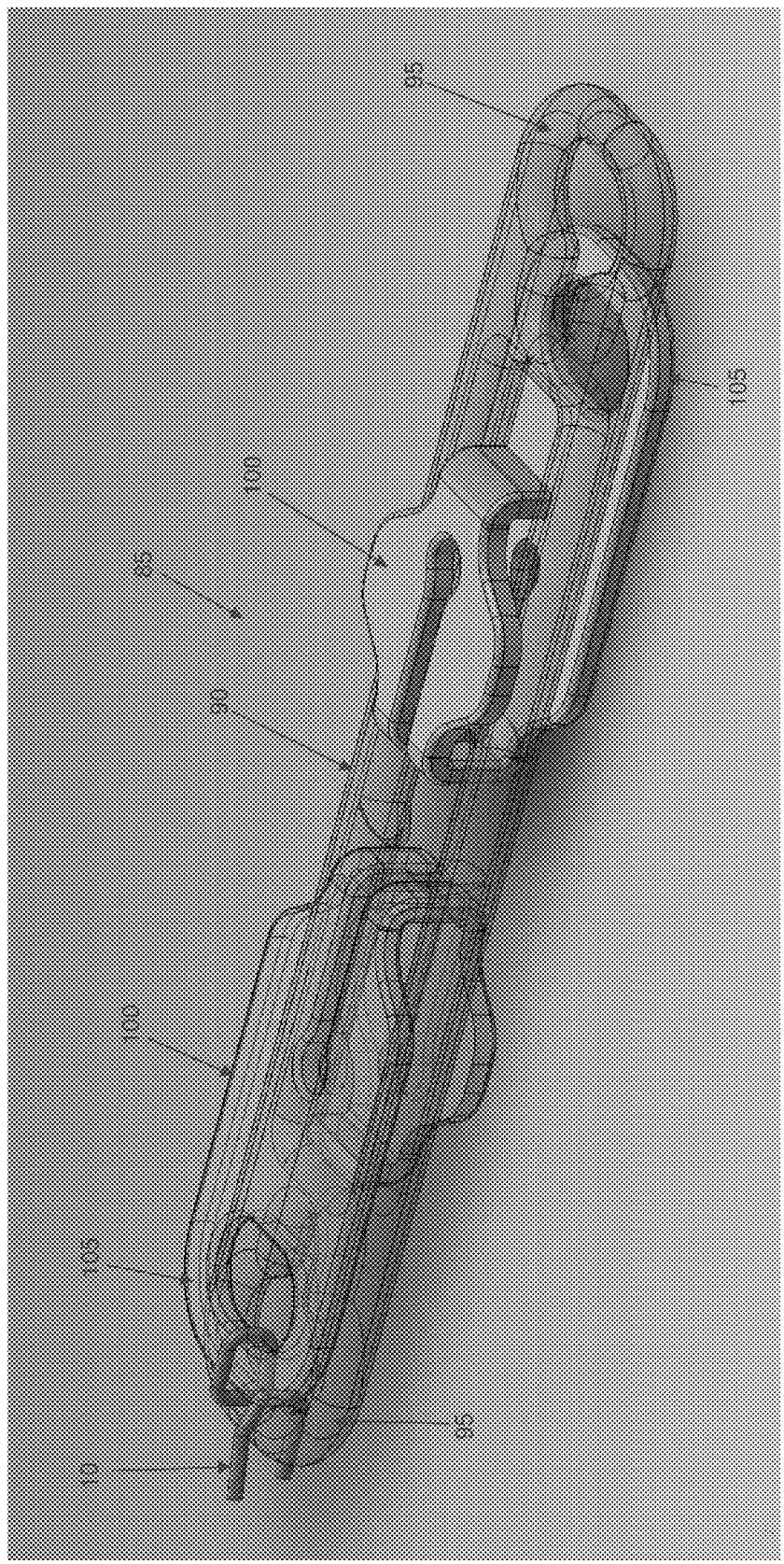
Figure 8:
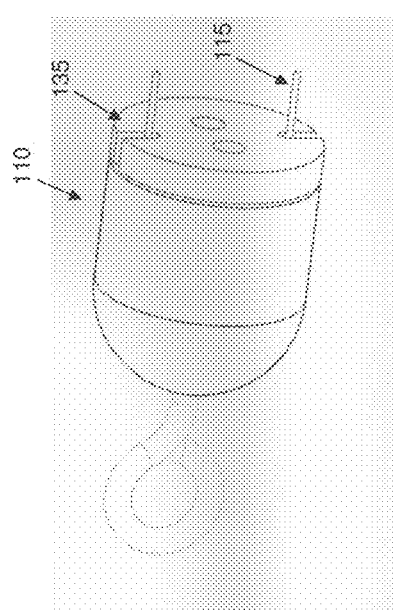
FIGS. 8-15 are schematic views showing another novel connector for connecting a fishing line to another fishing component (e.g., a hook, a lure, a weight, etc.)
Figure 9:
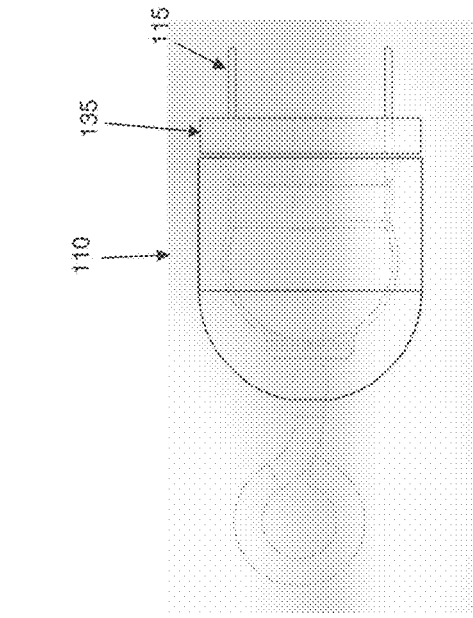
Figure 10:
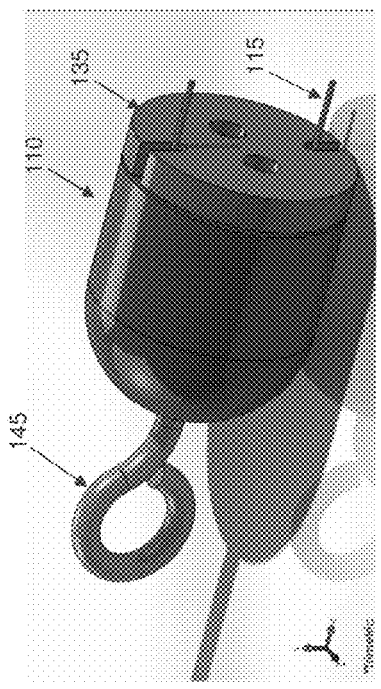
Figure 11:
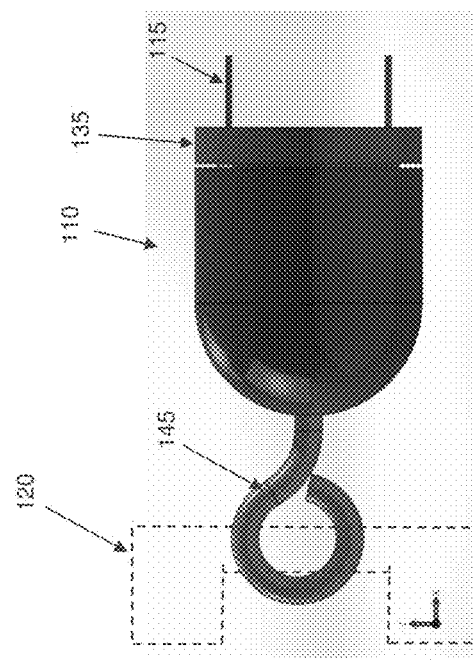
Figure 13:
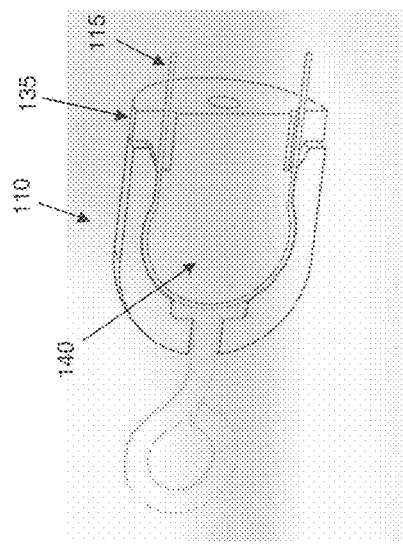
Figure 12:
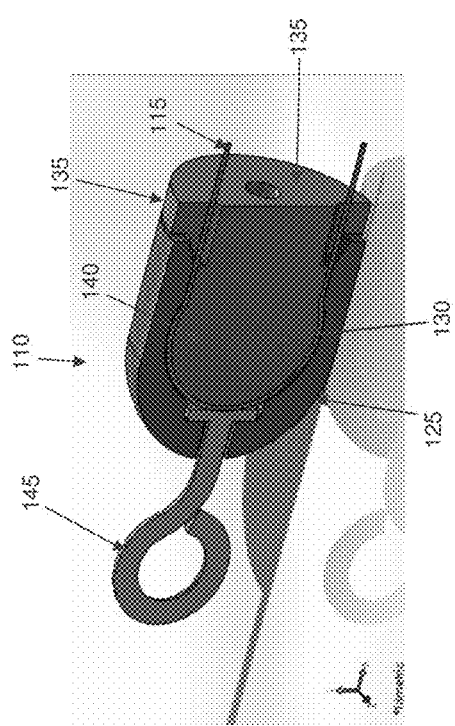
Figure 14:
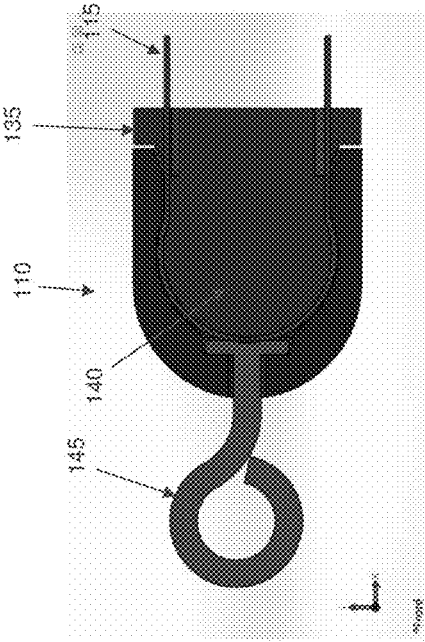

FIGS. 6 and 7 show another connector 85 for knotlessly connecting together two fishing lines. More particularly, in this form of the invention, a body 90 provides a frame for the connector and, simultaneously, provides two first loops 95 (i.e., one at each end of body 90). A pair of independently slidable sleds 100 are slidably mounted to body 90, with each sled 100 providing a second loop 105 thereon. In use, one fishing line is appropriately threaded through a first loop 95 and through its associated second loop 105 at one end of body 90, and another fishing line is appropriately threaded through a first loop 95 and its associated second loop 105 at the other end of body 90, and then the free ends of each of the fishing lines are pulled so as to knotlessly secure the two fishing lines to connector 85 (and hence to knotlessly secure the two fishing lines to one another).

Looking next at FIGS. 8-15, there is shown another connector 110 for connecting a fishing line 115 to another fishing component 120 (e.g., a hook, a lure, a weight, etc.). Connector 110 generally comprises a body 125 having an undercut recess 130 formed therein, and a plug 135 having an enlarged head 140 formed thereon. At least one of body 125 and plug 135 is formed out of a resilient material. Undercut recess 130 of body 125 and enlarged head 140 of plug 135 are sized so that when the two elements are forcibly brought together, they will form a snug snap-fit, with enlarged head 140 of plug 135 securely captured within undercut recess 130 of body 125. Body 125 also includes an eyelet 145 for receiving fishing component 120. In use, fishing line 115 is threaded around the perimeter of enlarged head 140 so that when enlarged head 140 is snap-fit within undercut recess 130 of body 125, fishing line 115 is secured to connector 110, whereby fishing line 115 can be knotlessly secured to connector 110, and hence to fishing component 120.

FIGS. 15A-15I show a pliers tool 147 which may be used to set connector 110. More particularly, pliers tool 147 comprises a first jaw 148 which is bifurcated at its end for receiving body 125 of connector 110, and a second jaw 149 for receiving plug 135 of connector 110. Second jaw 149 preferably includes slots 149A for receiving fishing line 10 when plug 135 is seated in second jaw 149. It will be appreciated that with pliers tool 147, when the handle of the pliers tool is squeezed, body 125 and plug 135 will be brought together so as to snap-fit plug 135 within body 125.

Figure 15:
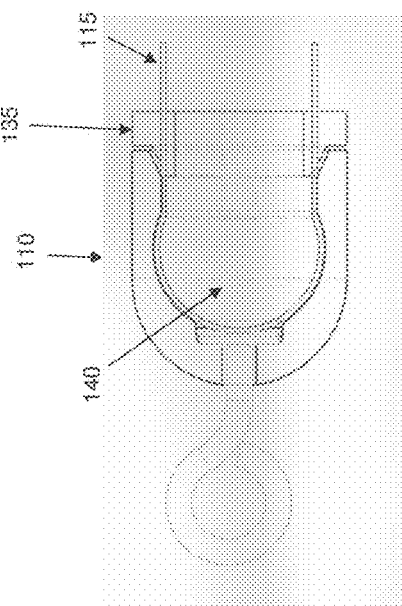
Figure 15G:
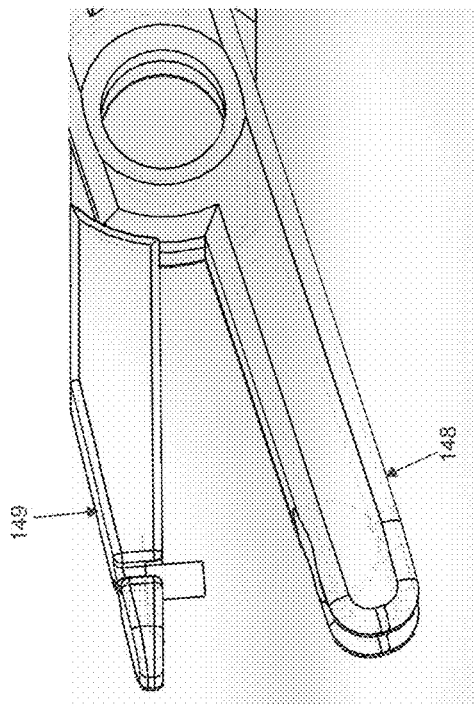
Figure 15I:
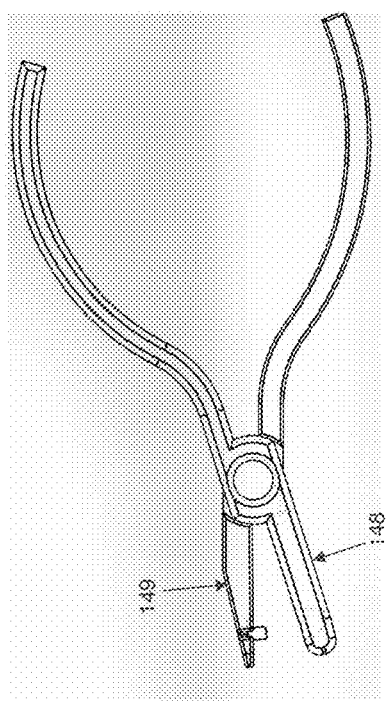
Figure 15F:
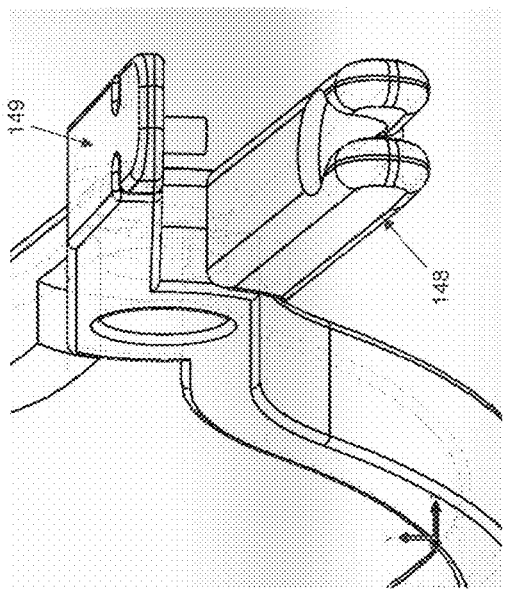
Figure 15H:
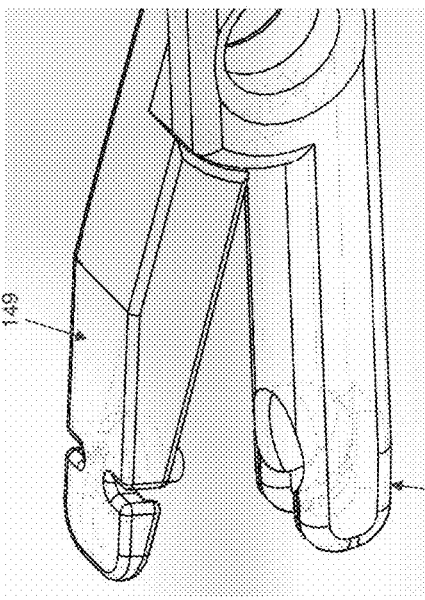
Figure 15K:
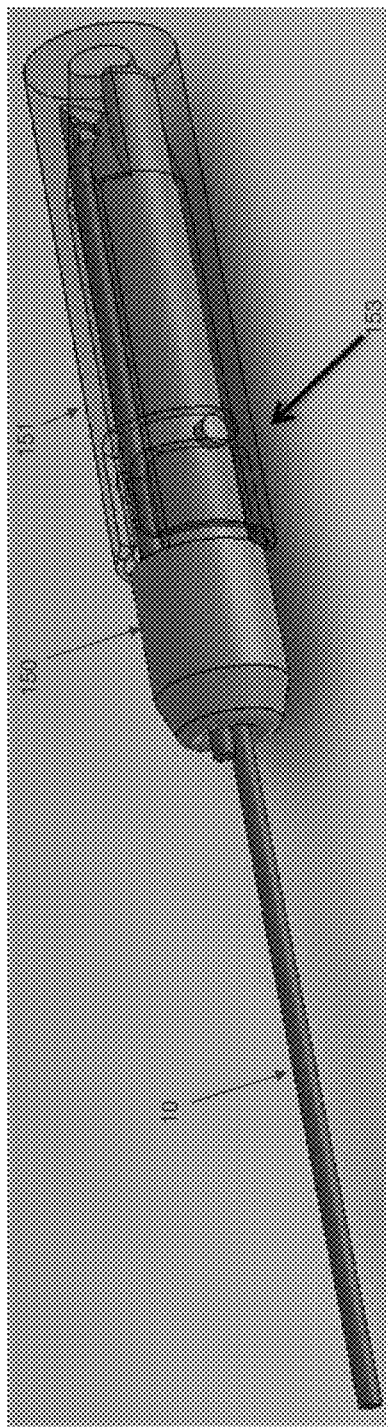
FIGS. 15K and 15L are perspective views of alternative novel connectors that may be incorporated into a lure or other fishing component so as to facilitate attachment of a fishing line to the lure or other fishing component without requiring the tying of a knot.
Figure 15L:
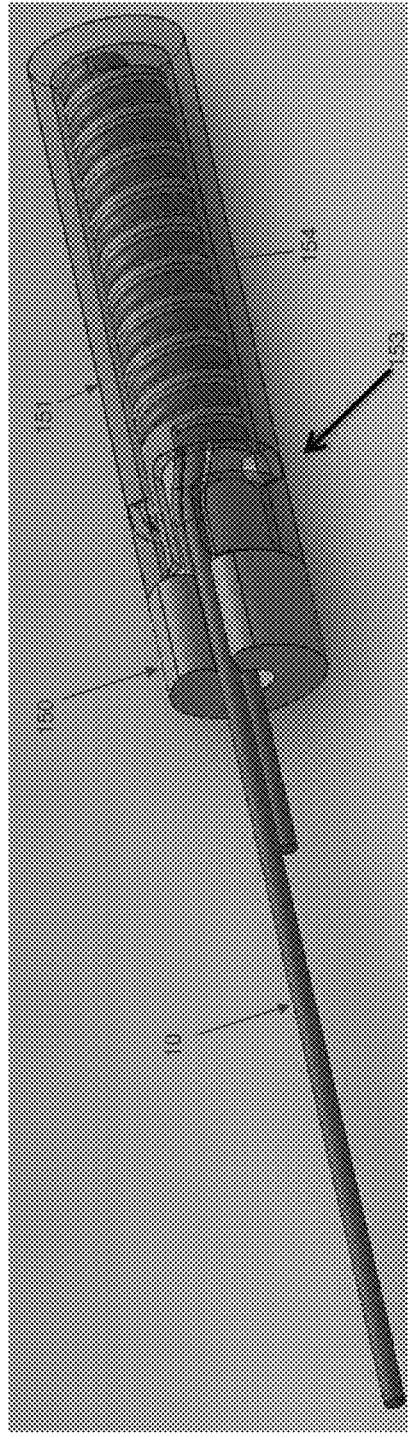

FIGS. 15J-15L are perspective views showing connectors that facilitate connection of a fishing line to a lure, weight, hook, or other component, etc., by connecting the fishing line to a connector which may then be inserted into a lure, weight, hook, or other component, etc.

FIG. 15J shows how a loop of fishing line 10 may be captured in position between an interior silicone compression core 150 and an outer sheath or cylinder 151, so as to capture the fishing line to the outer sheath or cylinder. The outer sheath or cylinder 151 may then be secured to (e.g., received within) another fishing component, e.g., a lure, weight, hook or other component, etc., as will hereinafter be discussed. By way of example but not limitation, outer sheath or cylinder 151 may comprise a C-ring connector 152 which mates with a corresponding connector (e.g., a groove, not shown) in the fishing component, e.g., a lure, weight, hook or other component, etc.

FIGS. 15K and 15L show variations of the connector shown in FIG. 15J. More particularly, in FIG. 15K, a BNC (Bayonet Neill-Concelman) connector 153 helps mount the interior silicone compression core 150 to the other sheath or cylinder 151, which is then mounted to another fishing component, e.g., a lure, a weight, a hook, or other component. FIG. 15L shows a similar construction, except that the interior silicone compression core 150 comprises a helical recess 154 for receiving fishing line 10 prior to inserting silicone compression core 150 into outer sheath or cylinder 151.

Thus it will be seen that FIGS. 15J-15L show various connectors that facilitate connection of a fishing line to a lure, weight, hook, or other component, etc., by connecting the fishing line to a connector which may then be inserted into a lure, weight, hook, or other component, etc. In this respect it should be appreciated that features may be incorporated in these connectors, as well as in the connectors described elsewhere herein, that facilitate locking the connector (and hence the fishing line) to the lure, weight, hook, or other component, etc. By way of example but not limitation, such locking features may include a ratchet mechanism between the outer surface of the connector and the interior surface of the lure, weight, hook, or other component, etc. By way of further example but not limitation, such locking features may include the provision of expandable arms on the connector that engage the interior surface of the lure, weight, hook or other component, etc.

Alternatively, the connector mechanisms that enable securing a fishing line to the connector, or the locking features that enable securing the connector to a lure, weight, hook, or other component, etc., may be fabricated from, or incorporate, sub-components that are deformable, such that once positioned for attachment, deforming the connector or connector sub-component(s) effects attachment of the fishing line to the connector or effects attachment of the connector to the lure, weight, hook, or other component, etc.

By way of example but not limitation, FIGS. 15M-15V show a connector that can be pre-attached to fishing line (e.g., with the mechanisms disclosed herein) and then inserted into a lure, hook, weight, or other component, etc., and locked in place within the lure, hook, weight, or other component, etc., whereby to secure the fishing line to the lure, hook, weight, or other component, etc.

Figure 15M:
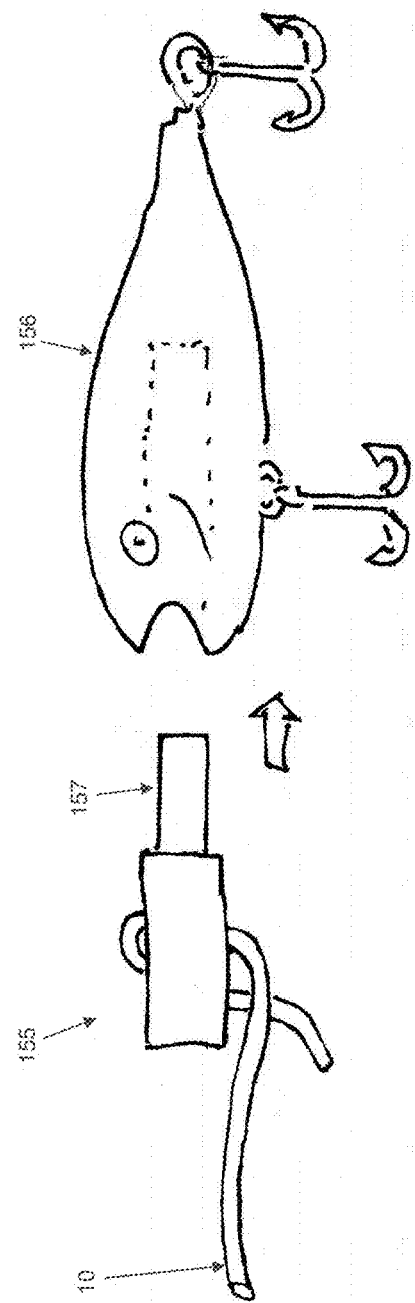
FIGS. 15M, 15N and 15O are schematic views showing a novel connector that may be inserted into, or pre-attached to, a lure or other fishing component so as to facilitate attachment of a fishing line to the lure or other fishing component without requiring the tying of a knot.
Figure 15N:
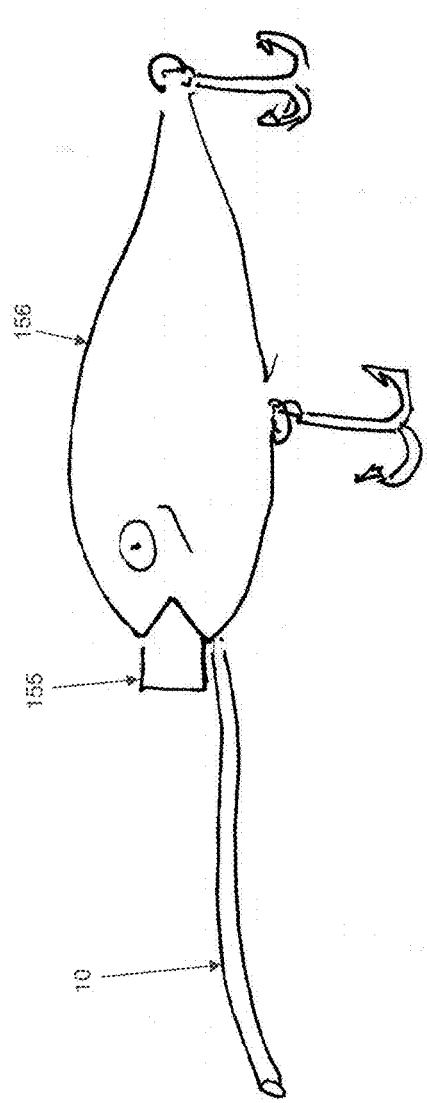
Figure 15O:
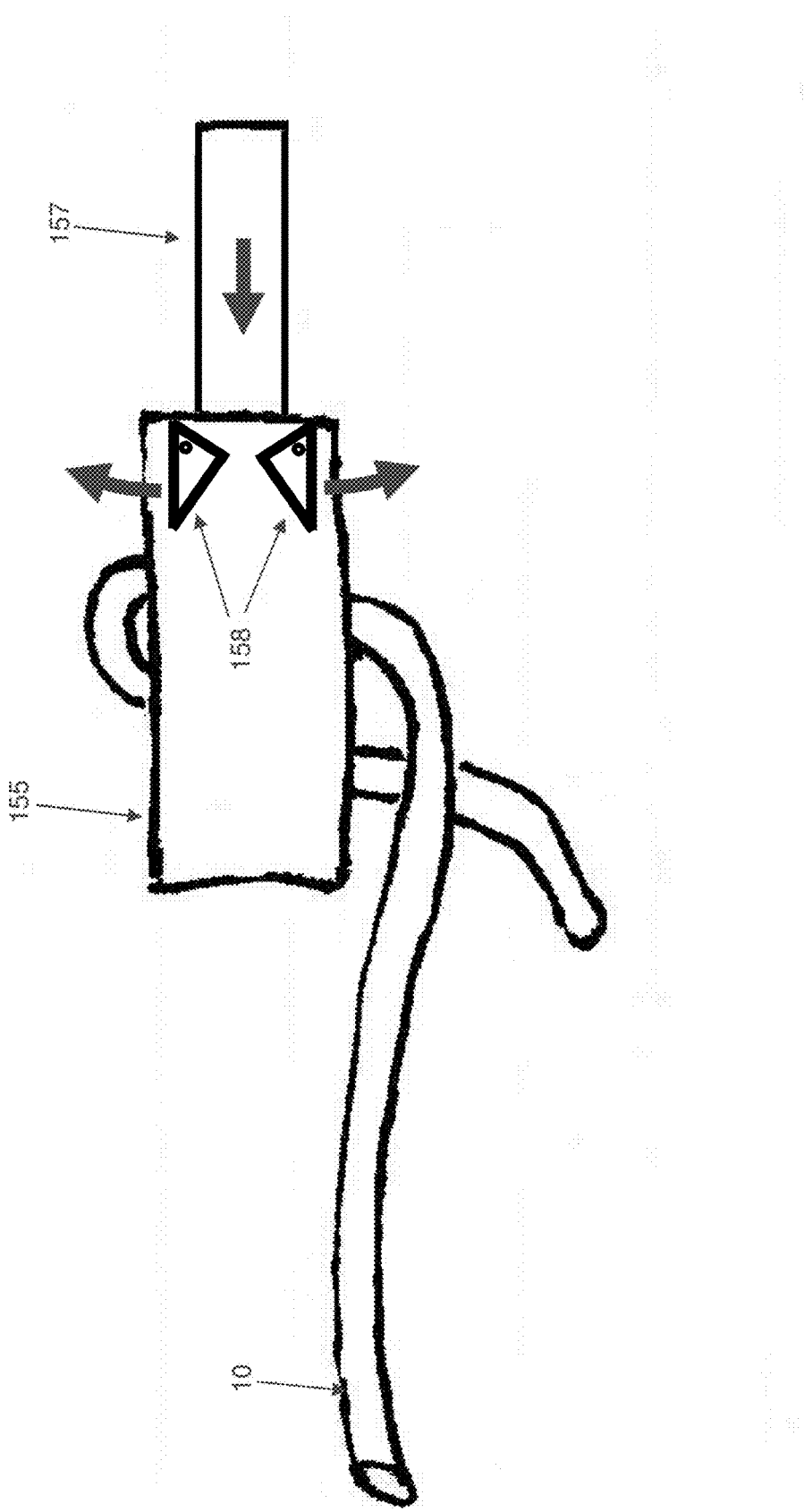
Figure 15U:
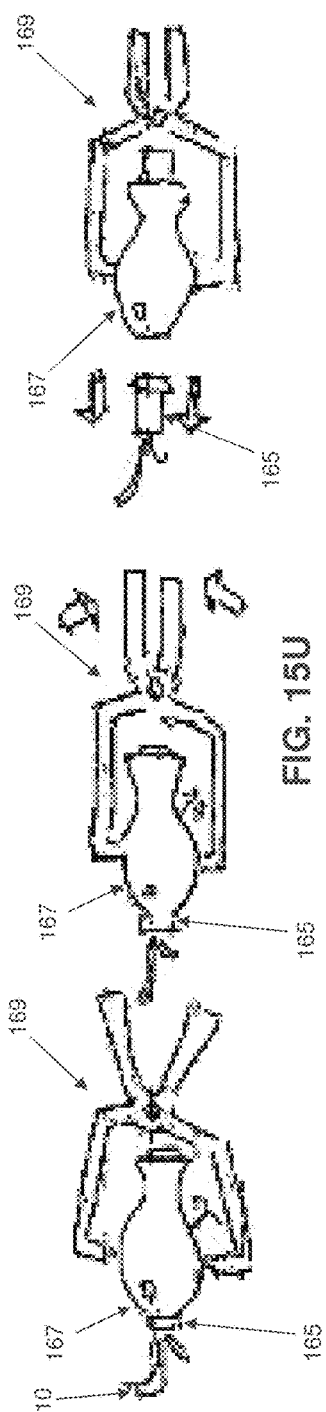
Figure 15V:
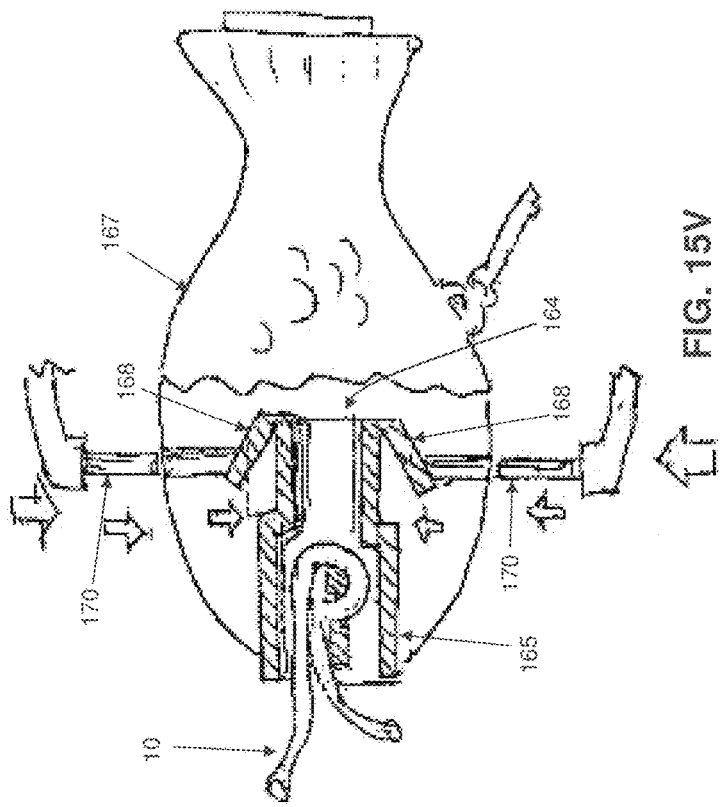

FIGS. 15M-15O show the general concept of attaching a connector 155 (with a fishing line 10 pre-attached thereto) to a lure, hook, weight, or other component, etc. 156, where connector 155 comprises knotless means for connecting fishing line 10 to connector 155, and where connector 155 comprises an actuator 157 which, when pressed into the remainder of connector 155, deploys a pair of wings 158 which secure connector 155 to lure, hook, weight, or other component, etc. 156.

FIGS. 15P and 15Q show another connector 159 for insertion in a lure, hook, weight, or other component, etc. 160, where connector 159 comprises knotless means for connecting fishing line 10 to connector 159, and where lure, hook, weight, or other component, etc. 160 comprises an actuator 161 which, moved, causes a latch 162 to capture an element 163 of connector 159, whereby to secure connector 159 to lure, hook, weight, or other component, etc. 160.

FIGS. 15R-15T shows a spring-loaded expansion mechanism 164, incorporated into the connector 165, that locks to a mating indentation 166 formed within the lure, hook, weight, or other component, etc. 167. In this form of the invention, as the connector 165 is advanced into the lure, hook, weight, or other component, etc. 167, the spring-loaded arms or teeth 168 of spring-loaded expansion mechanism 164 are deflected inward until they advance beyond the mating indentation 166, at which time they can re-expand and lock the connector 165 to the lure, hook, weight, or other component, etc. 167. When connector 165 is to be released from the lure, hook, weight, or other component, etc. 167, and looking now at FIGS. 15U and 15V, a tool 169, having a pair of fingers 170, can be used to re-compress the spring-loaded arms or teeth 168 of spring-loaded expansion mechanism 164, whereby to free connector 165 from the lure, hook, weight, or other component, etc. 167.

In another form of the present invention, the spring-loaded expansion mechanism 164 may be incorporated in the lure, hook, weight, or other component, etc. 167, such that once the connector is inserted into the lure, hook, weight, or other component, etc. 167, the spring-loaded expansion mechanism 164 is compressed, thereby deflecting the spring-loaded arms or teeth 168 that engages the connector and restrains the connector in place.

Figure 16:
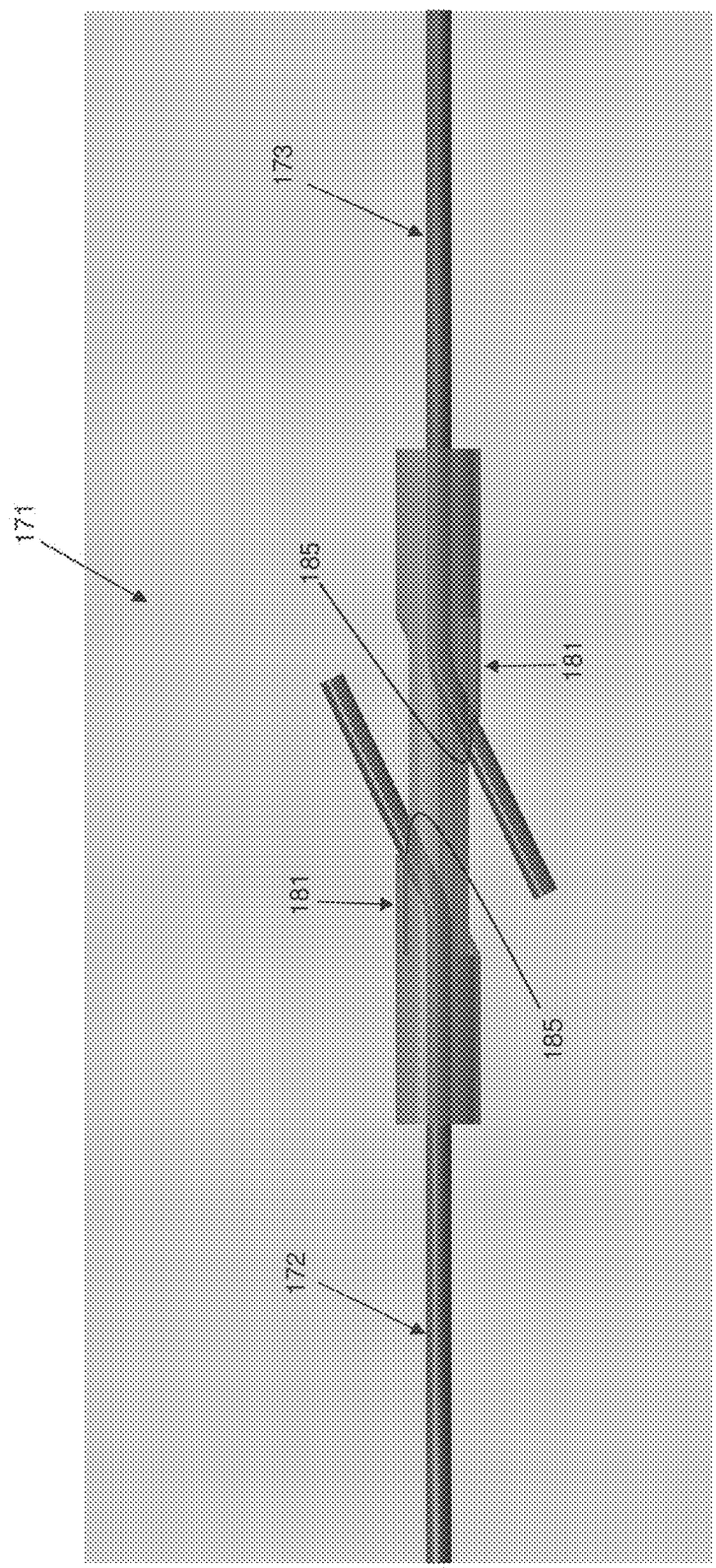
FIGS. 16 and 17 are schematic views showing another novel connector for connecting one fishing line to another fishing line.
Figure 17:
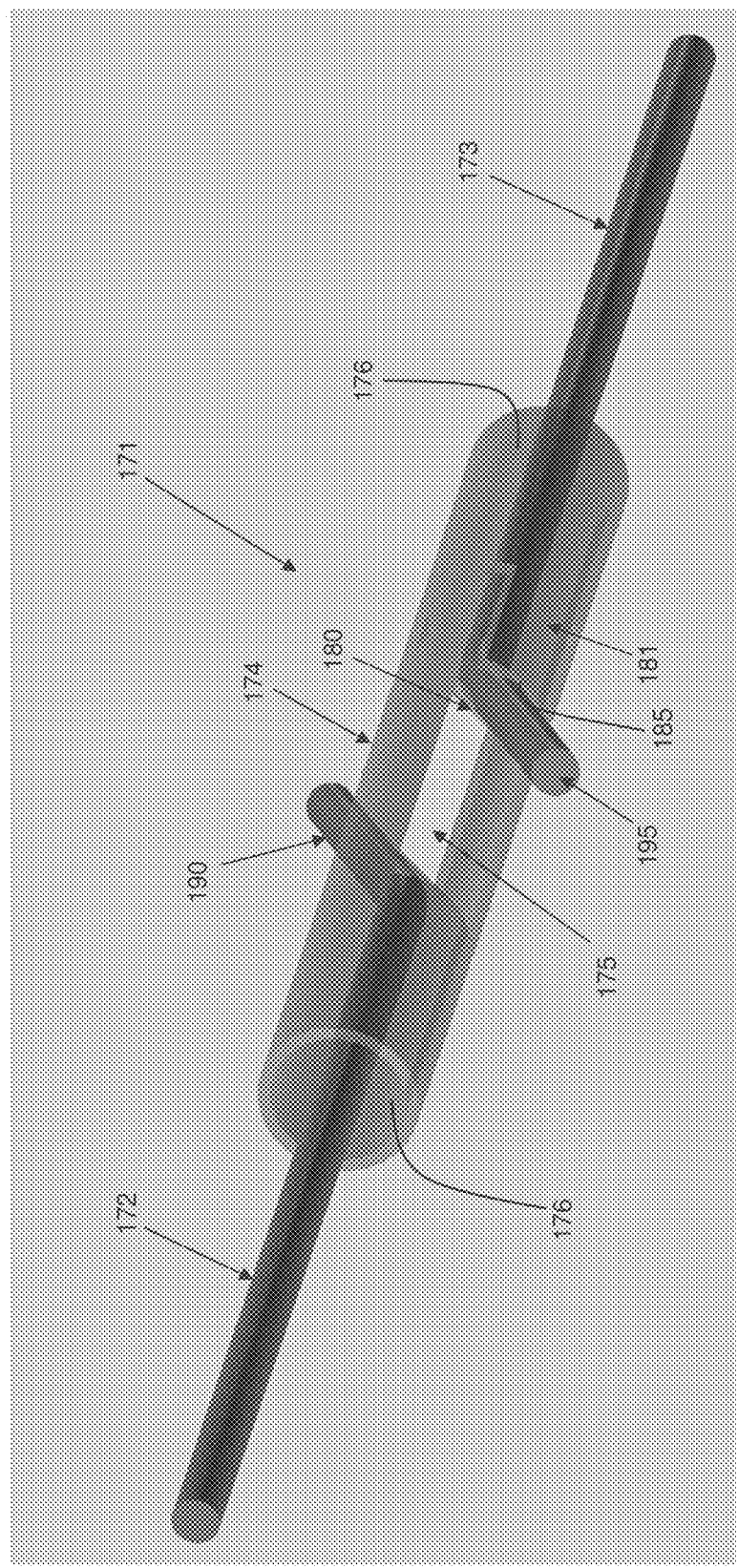

FIGS. 16 and 17 show another connector 171 for knotlessly connecting together two fishing lines 172, 173. In this form of the invention, connector 171 comprises a body 174 having a diametrical opening 175 extending therethrough. Connector 171 also comprises a pair of longitudinal openings 176 extending inwardly into body 174 from its two opposing ends. Longitudinal openings 176 communicate with diametrical opening 175. Adjacent to diametrical opening 175, substantially straight, substantially rigid portions 180 of body 174 cooperate with angled, resilient portions 181 of body 174 so as to form a pair of one-way latch mechanisms for securing fishing lines 172, 173 to connector 171, and hence to one another. More particularly, each of the substantially straight, substantially rigid portions 180 extend substantially parallel to the outer surface of body 174. Each of the angled, resilient portions 181 extend at an angle to the longitudinal axis of body 174 and terminate in an interior edge 185. Interior edge 185 is set to engage a fishing line extending between the substantially straight, substantially rigid portion 180 and the angled, resilient portion 181. As a result of this construction, when the end 190 of fishing line 172 (or the end 195 of the fishing line 173) is advanced inwardly into center opening 175, passing between a substantially straight, substantially rigid portion 180 and an angled, resilient portion 181, with interior edge 185 engaging the fishing line, retrograde motion of the fishing line will be prohibited by engagement of the interior edge 185 of the angled, resilient portion 181 with the fishing line. Thus, fishing lines 172 and 173 may be knotlessly joined to one another by feeding them through opposing ends of connector 171 and then pulling them retrograde, whereby to secure the two fishing lines to connector 171 (and hence to one another).

Figure 18:
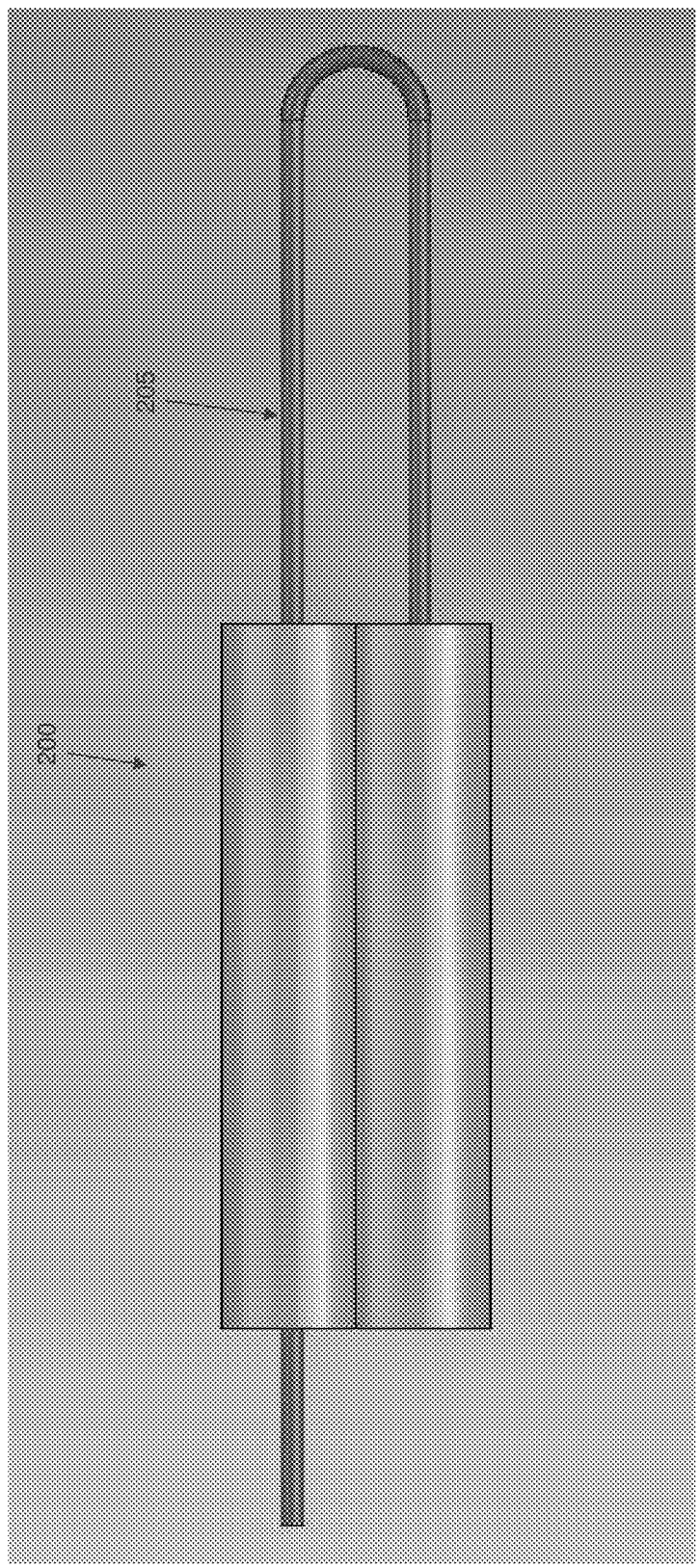
FIGS. 18 and 19 are schematic views showing another novel connector for connecting a fishing line to another fishing component (e.g., a hook, a lure, a weight, etc.)
Figure 19:
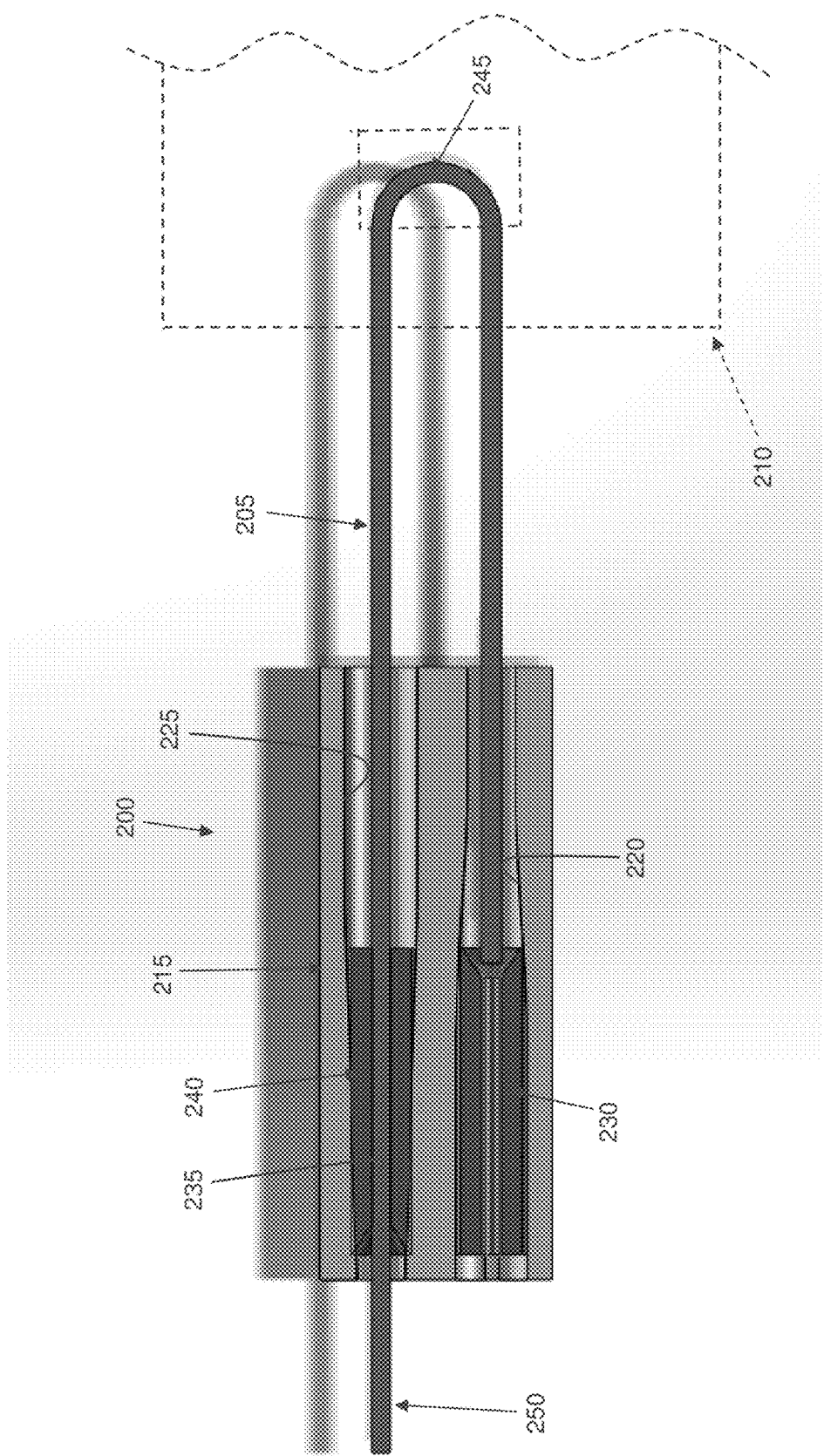

Looking next at FIGS. 18 and 19, there is shown another connector 200 for connecting a fishing line 205 to another fishing component 210 (e.g., a hook, a lure, a weight, etc.). Connector 200 generally comprises a body 215 having a pair of tapered bores 220, 225 formed therein. Bore 220 tapers in a first direction (i.e., distally), and bore 225 tapers in a second direction (i.e., proximally). One end of fishing line 205 is secured to an elastomeric plug 230, and another portion of fishing line 205 passes through a central bore 235 of an elastomeric plug 240. On account of this construction, a loop 245 of fishing line 205 may exit body 215, pass through fishing component 210 and then pass back through plug 240, such that when portion 250 of fishing line 205 is pulled in the second direction (i.e., proximally), plug 230 will bind in bore 220, and plug 240 will bind in bore 225 and grip fishing line 205, whereby to secure fishing component 210 to loop 245 of fishing line 205.

It will also be appreciated that, if desired, connector 200 can be used to connect together two separate lines, e.g., so as to serve as a line-to-line attachment mechanism. In such an application, one line (e.g., the distal line) is connected to plug 230, such that tension on this line secures the line to body 215; and the other line (e.g., the proximal line) is connected to the plug 240, such that tension on this second line secures the line to body 215. In this way, connector 200 can be used to connect together two separate lines.

Method and Apparatus for Adjusting the Buoyancy of Fishing Components

Figure 21:
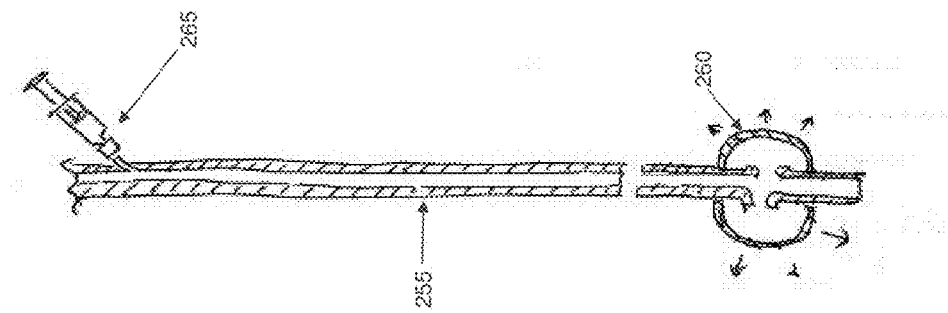
FIGS. 20 and 21 are schematic views showing a novel fishing line which may be used to adjust the buoyancy of a fishing component in situ.
Figure 20:
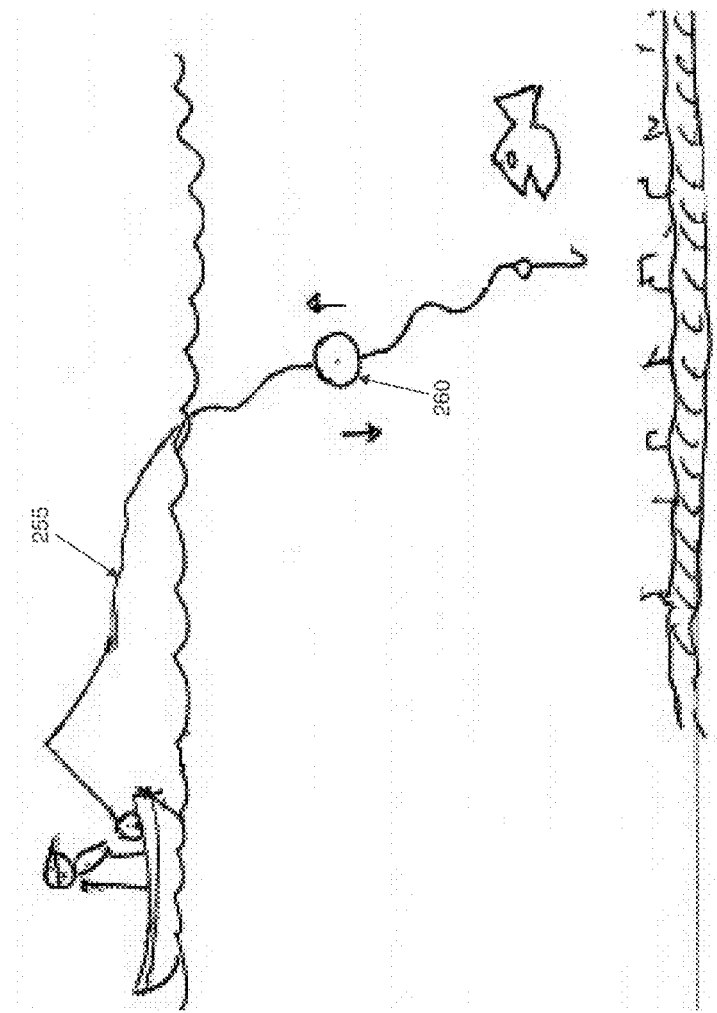
Figure 23:
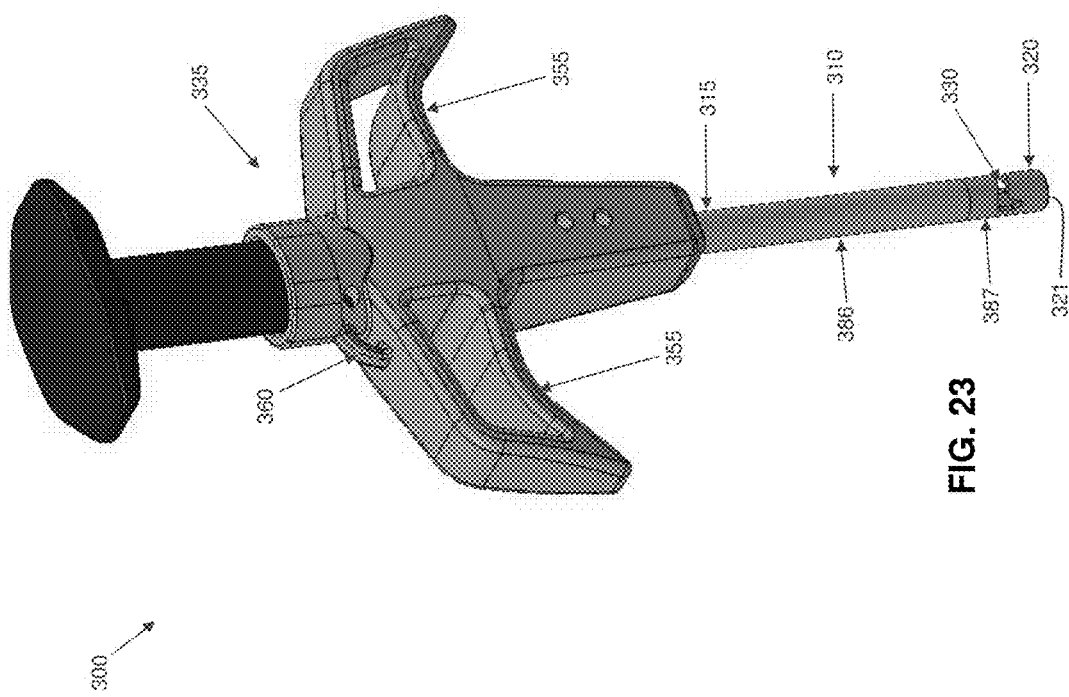
Figure 24:
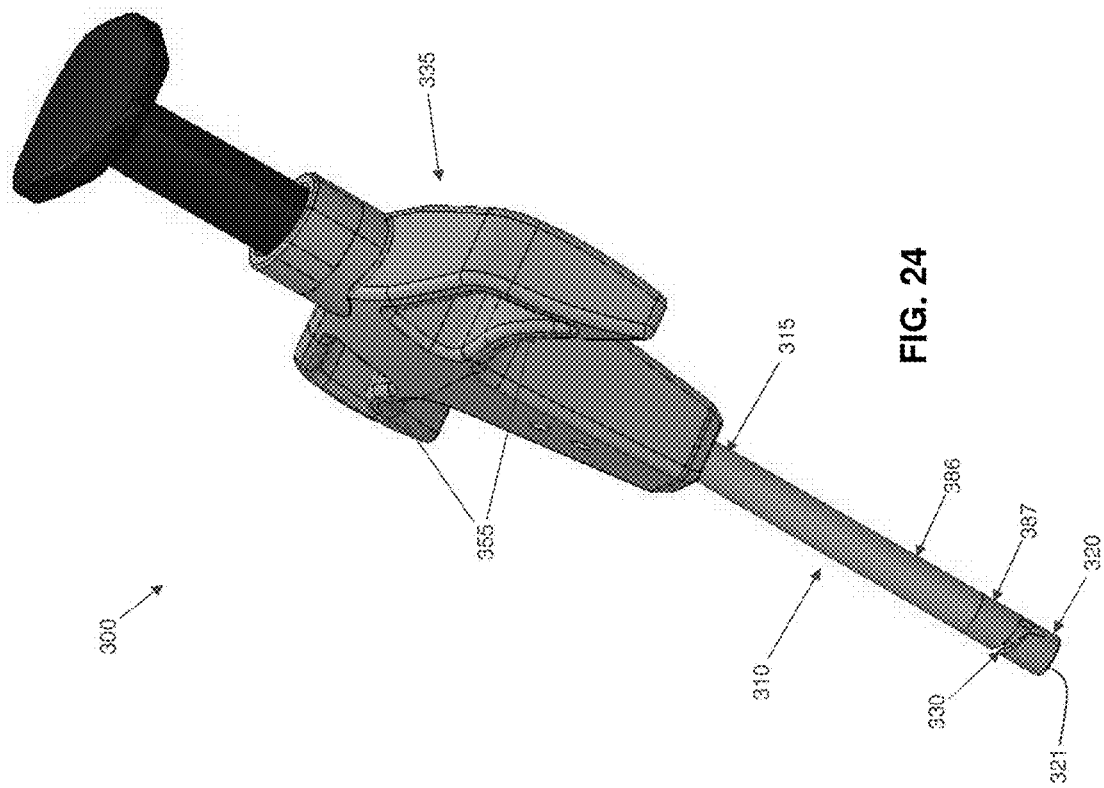
Figure 26:
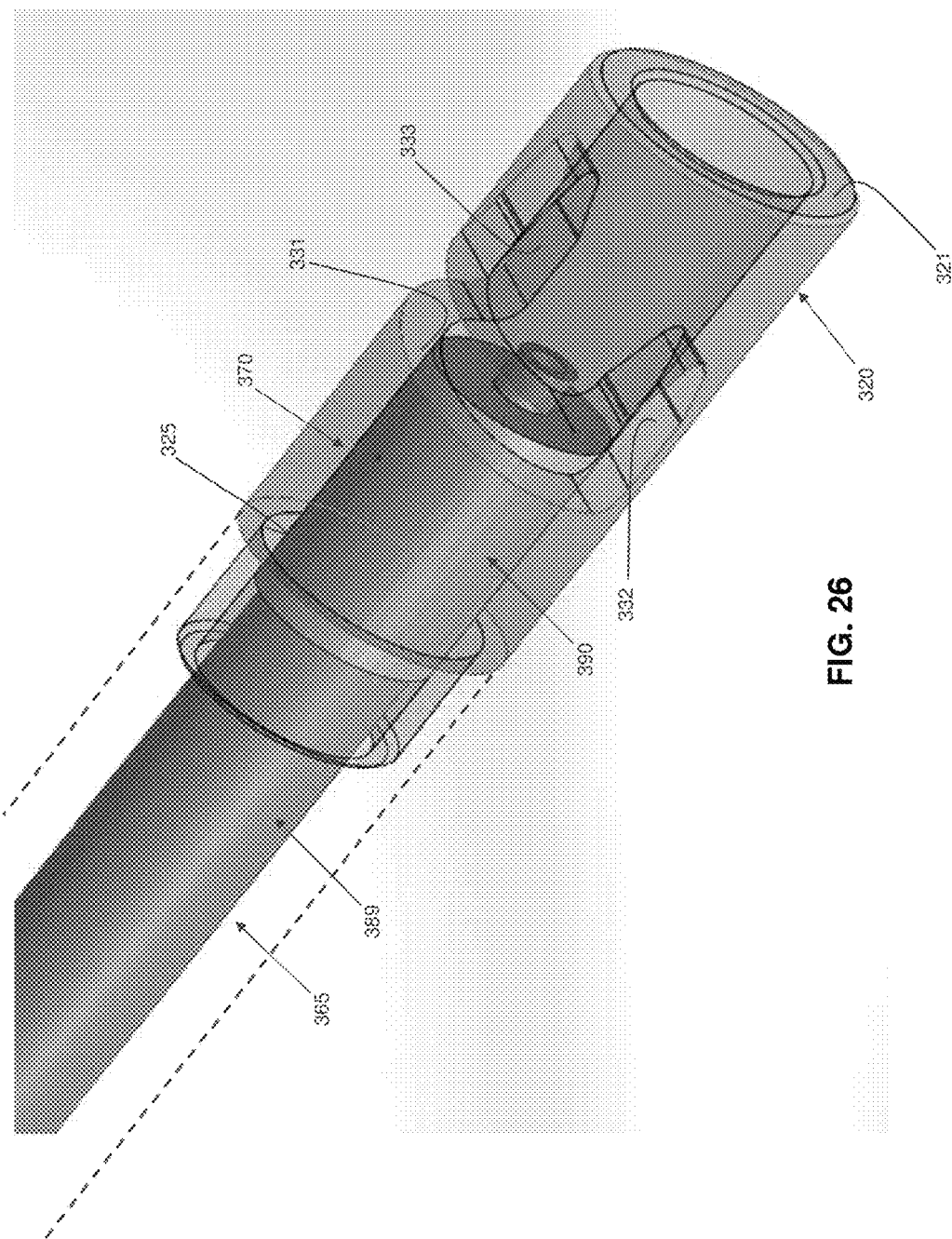
Figure 27:
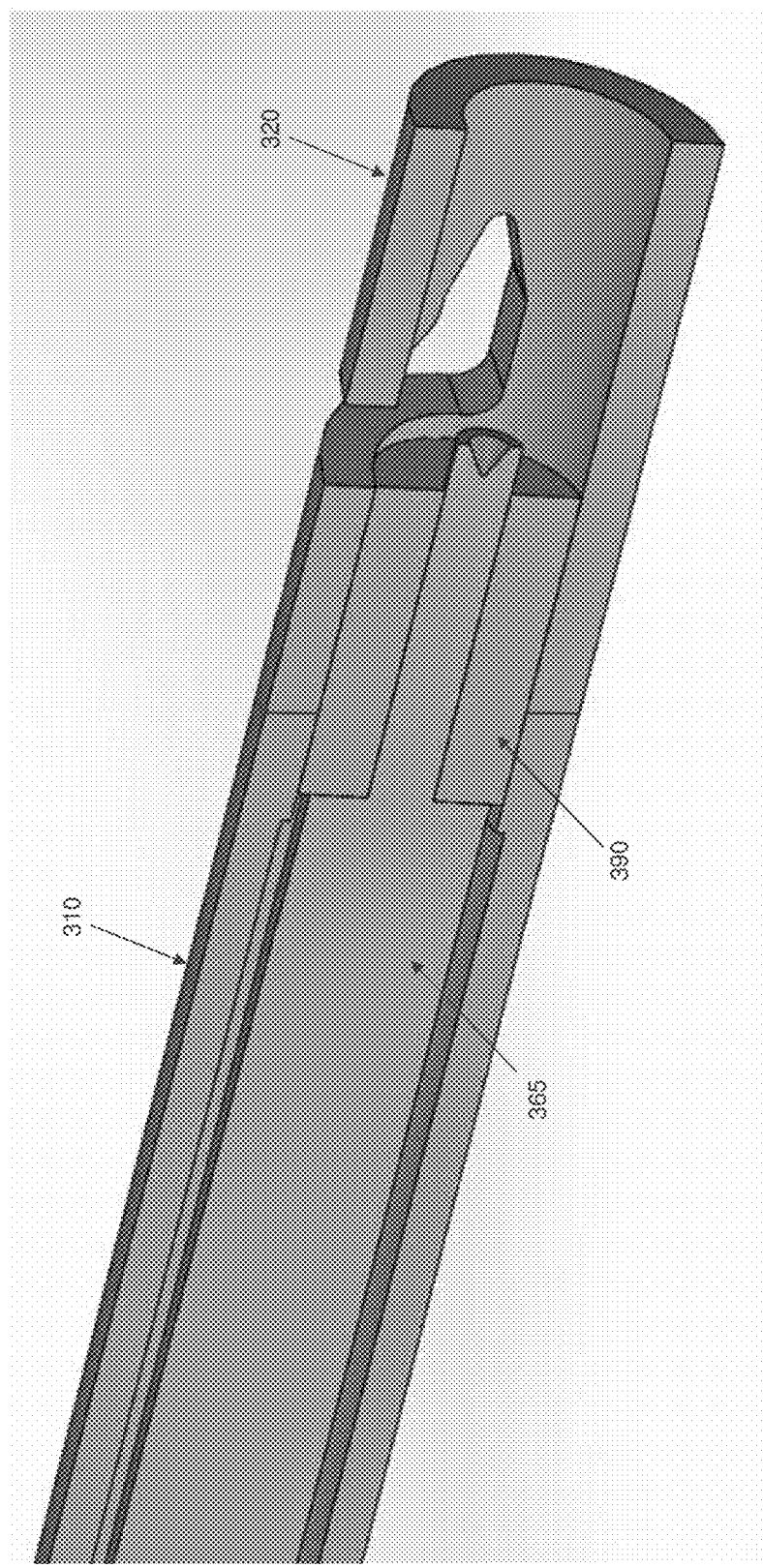

In some circumstances it may be desirable to adjust the flotation of fishing components in situ. By way of example but not limitation, in some situations it may be desirable to adjust the level of flotation of a hook and lure within the water. In this situation, and looking now at FIGS. 20 and 21, a hollow fishing line 255 may be provided, with hollow fishing line 255 having an expandable (e.g., balloon) float 260 fixed thereon, and with the hollow interior of expandable (e.g., balloon) float 260 being in fluid communication with the hollow interior of hollow fishing line 255. As a result of this construction, the volume of expandable (e.g., balloon) float 260 may be adjusted remotely by an inflator 265 communicating with the interior of hollow fishing line 255, whereby to adjust the buoyancy of expandable (e.g., balloon) float 260. The expandable (e.g., balloon) float 260 may be used (e.g., by injecting or removing air) to tailor the buoyancy of the lure, hook, weight, or other component, etc., and enable on-the-spot modification of the depth at which the lure, hook, weight, or other component, etc., resides.

Alternatively, a separate component fabricated as an expandable bladder or balloon may be fed over a conventional (e.g., a non-hollow) fishing line and attached in place, or allowed to move freely along the line. In this form of the invention, the expandable bladder or balloon is provided with a corresponding inflation/deflation tube, whereby to provide adjustable buoyancy to the expandable bladder or balloon and hence adjustable buoyancy to the fishing line. This buoyancy bladder or balloon may be fabricated from PTFE, PET, polyester, urethane, silicone, polyurethane, or other known material.

If desired, the expandable (e.g., balloon) float 260 or expandable bladder or balloon may be fabricated from a porous or microporous material to allow the diffusion of solutions that attract fish, or to provide some other purpose (e.g., to mark a location in the water with a dye solution, etc.).

It should be noted that the inflation and diffusion capabilities discussed above for the expandable (e.g., balloon) float 260 or expandable bladder or balloon may, alternatively, be incorporated in the design of the lure, hook, weight, or other component, etc.

Method and Apparatus for Cutting a Fishing Line

In many situations it may be necessary and/or desirable to cut a fishing line, e.g., to cut off a free end where a fishing line has been connected to a lure, a hook, a weight, or other fishing component, etc., and/or where a fishing line has become entangled, etc. In this respect it will be appreciated that cutting the fishing line with an exposed blade (e.g., a knife) can present a safety issue, particularly when done on a moving boat, and/or in the dark, and/or in cold or inclement weather conditions, etc. In addition, cutting the fishing line with an exposed blade can also present the risk of cutting the wrong length of fishing line, e.g., when cutting an entangled fishing line, and particularly when cutting the entangled fishing line on a moving boat in the dark. To this end, the present invention provides a novel method and apparatus for cutting a fishing line which provides enhanced user safety and increased cutting accuracy, by shielding a cutting blade within a protective tube and configuring the tube so as to hold the target fishing line in position, whereby to enable "blind" cutting of the fishing line.

More particularly, and looking now at FIGS. 22-27, there is shown a fishing line cutting tool 300 for cutting a fishing line 305, e.g., to cut off a free end of the fishing line at a specific distance from a lure, a hook, a weight or other fishing component mounted to fishing line 305.

More particularly, fishing line cutting tool 300 generally comprises a hollow shaft 310 having a proximal end 315 and a distal end 320. A lumen 325 extends between proximal end 315 and distal end 320. Distal end 320 terminates in a distal end surface 321. A slot 330 is formed in distal end 320 of hollow shaft 310. Slot 330 is sized to receive fishing line 305 and direct fishing line 305 across lumen 325 of hollow shaft 310. In one preferred form of the invention, slot 330 has an angled front opening 331 leading to a pair of legs 332, 333 which terminate short of distal end surface 321. Leg 333 extends closer to distal end surface 321 than leg 332.

A handle 335 is secured to proximal end 315 of hollow shaft 310. More particularly, handle 335 comprises a stepped bore 340 extending between its distal end 345 and its proximal end 350. Finger grips 355 are preferably provided intermediate distal end 345 and proximal end 350 of handle 335. Handle 335 preferably also includes a lanyard eyelet 360, such that fishing line cutting tool 300 can be hung about the neck of a user, or hung about the wrist of a user, or hung off the belt of a user, e.g., for ready access and to prevent accidental loss overboard, and/or hung off a hook on a boat, etc., e.g., for ready access or storage.

A cutter shaft 365 is movably disposed within lumen 325 of hollow shaft 310 and stepped bore 340 of handle 335. Cutter shaft 365 comprises a distal end 370 and a proximal end 375, and reciprocates within lumen 325 of hollow shaft 310 so as to selectively move distal end 370 of cutter shaft 365 across slot 330 formed in hollow shaft 310 when fishing line 305 is disposed in slot 330, whereby to cut fishing line 305. To this end, a plunger 380 is secured to proximal end 375 of cutter shaft 365. A spring 385 biases plunger 380 (and hence cutter shaft 365) proximally so that distal end 370 of cutter shaft 365 normally resides proximally of slot 330.

As a result of this construction, when fishing line 305 is disposed in slot 330 and cutter shaft 365 is thereafter moved distally (e.g., via plunger 380), the distal end of cutter shaft 365 will pass by slot 330 and thereby shear fishing line 305 at slot 330. Note that inasmuch as slot 330 allows fishing line 305 to be slidably secured to hollow shaft 310 of fishing line cutting tool 300, and inasmuch as cutter shaft 365 is shielded within hollow shaft 310 as it reciprocates within hollow shaft 310, fishing line cutting tool 300 allows the fishing line to be cut with enhanced user safety and increased cutting accuracy. Among other things, fishing line cutting tool 300 enables fast, safe and "blind" cutting of the fishing line.

In practice, it has been found to be difficult to shear fishing line 305 with a "clean" cut, devoid of frayed edges. This is particularly true where fishing line 305 is made out of a polymer such as Ultra High Molecular Weight Polyethylene (UHMWP) which tends to be very tough and slippery, and/or where fishing line 305 is quite thin (e.g., on the order of 0.3 mm or less), and/or both. In these situations, the fishing line tends to stretch and fray during the shearing action, thereby inhibiting the formation of a clean cut. In order to provide a clean cut with a polymer fishing line, and/or a thin fishing line, and/or both, it is important to provide durable cutting surfaces (e.g., cutting surfaces which will hold an edge after repeated use) and extremely close tolerances between the parts (e.g., between distal end 370 of cutter shaft 365 and the wall of hollow shaft 310). However, this is relatively expensive to achieve.

Therefore, in accordance with the present invention, hollow shaft 310 is preferably formed out of two components, i.e., a main shaft 386 formed out of a relatively inexpensive material (e.g., plastic) and a distal tip 387 formed out of a relatively hard material (e.g., stainless steel); and cutter shaft 365 is preferably formed out of two components, e.g., a main shaft 389 formed out of a relatively inexpensive material (e.g., plastic) and a distal tip 390 formed out of a relatively hard material (e.g., carbide). Tolerances are preferably held to within 0.00002 inch, whereby to permit extremely thin (e.g., 0.3 mm or less) polymer fishing lines to be cut with clean, unfrayed edges. This construction minimizes the size of the components which need to be formed out of relatively expensive materials (e.g., carbide), thereby greatly reducing the cost of the fishing line cutting tool.

Thus it will be seen that the present invention provides a novel method and apparatus for cutting a fishing line, wherein cutting may be effected with enhanced user safety and increased cutting accuracy, since the cutting blade is shielded within a protective tube and the tube is configured so as to hold the target fishing line in position, whereby to enable "blind" cutting of the fishing line.

Figure 28:
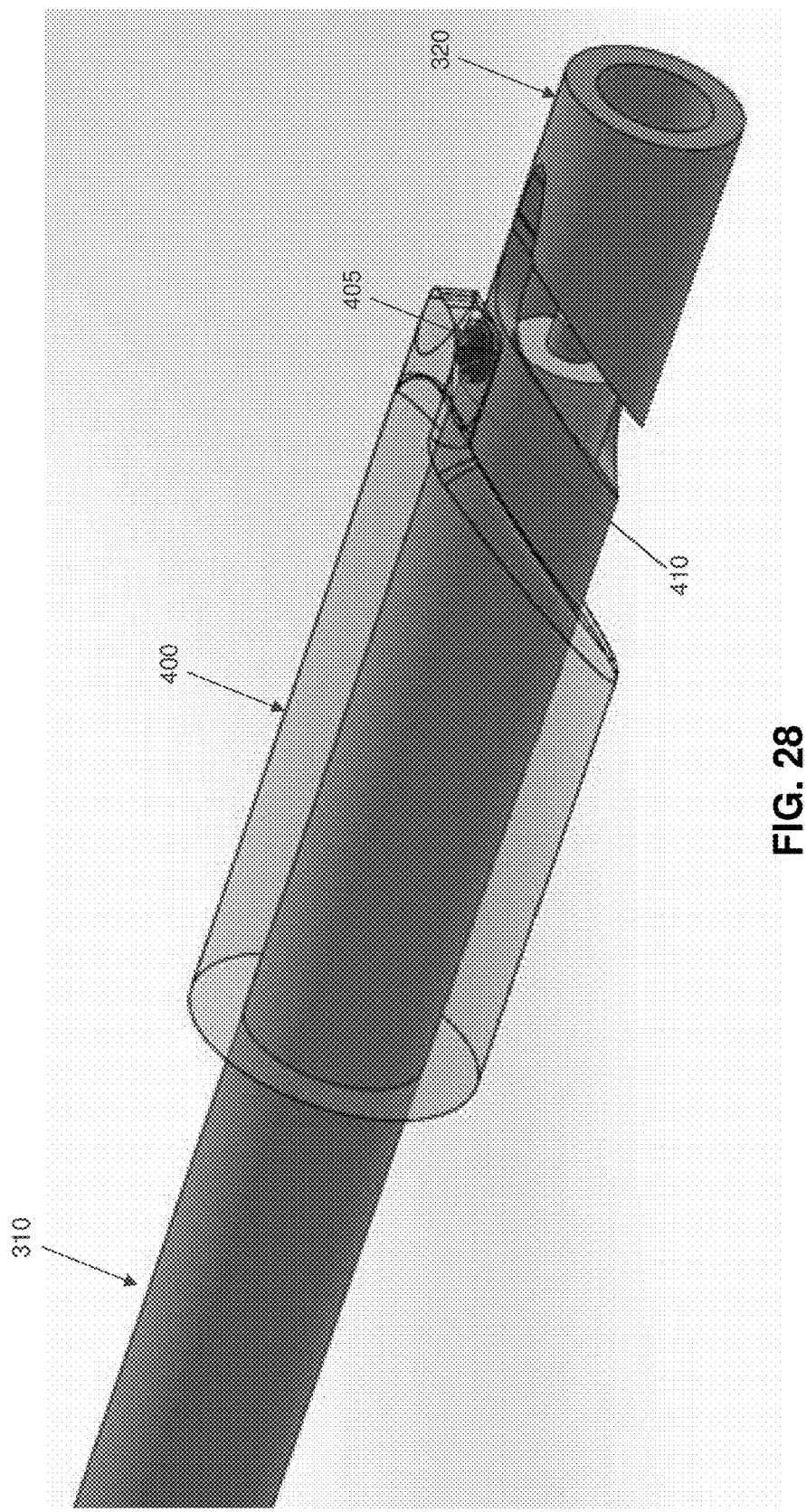
FIG. 28 is a schematic view showing a modified form of the fishing line cutter shown in FIGS. 22-27.

Alternatively, in another form of the invention, and looking now at FIG. 28, fishing line cutting tool 300 may comprise a holder 400 which carries a ball 405 which extends through a window 410 formed in hollow shaft 310. Ball 405 engages the distal tip of cutter shaft 365, whereby to force cutting shaft 365 laterally and thereby provide a tighter fit between cutting shaft 365 and hollow shaft 310. This tighter fit enhances the ability of the fishing line cutting tool to cleanly cut extremely thin (e.g., 0.3 mm or less) polymer fishing lines.

Figure 29:
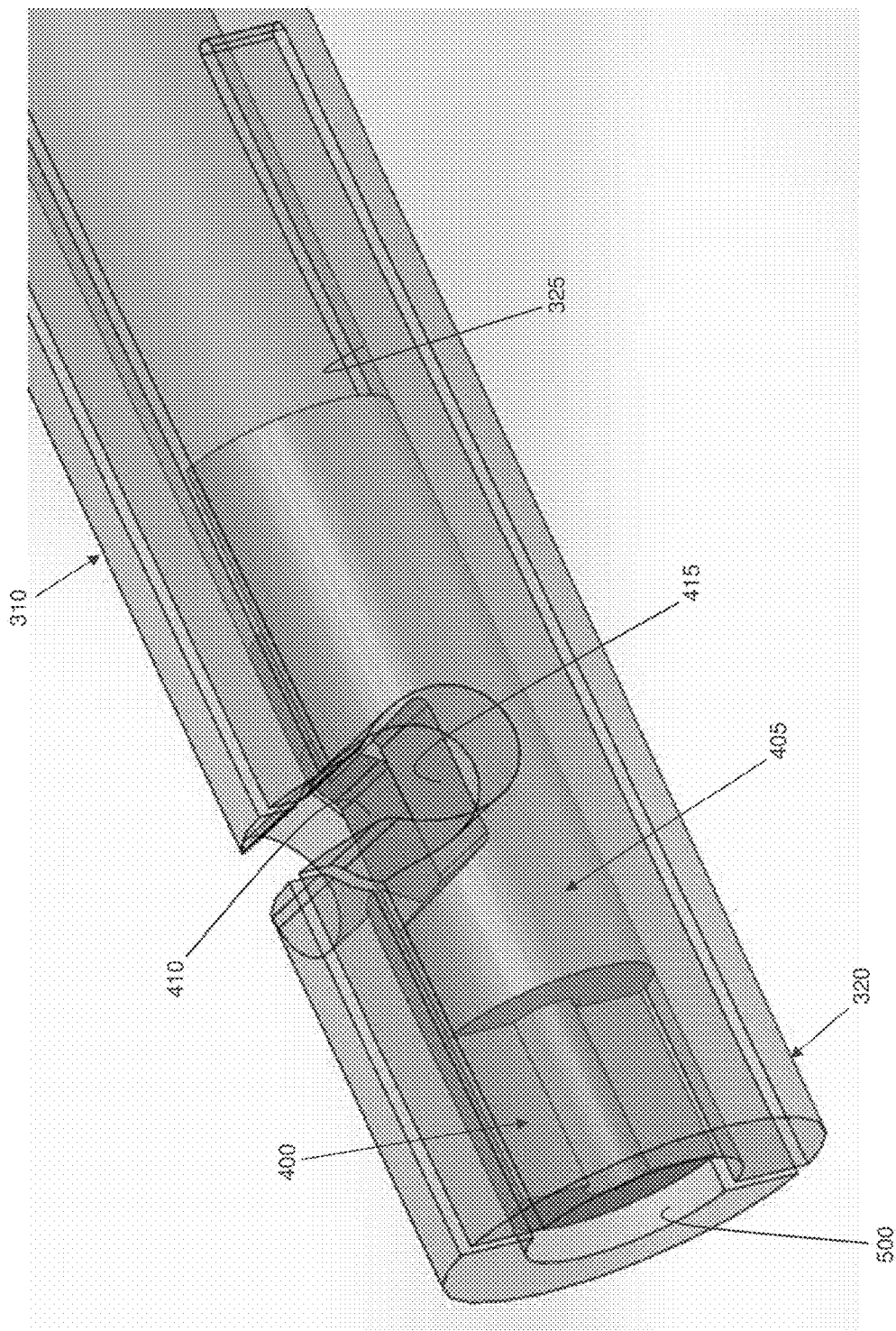
FIG. 29 is a schematic view showing another modified form of the fishing line cutter shown in FIGS. 22-27.

In another form of the invention, and looking now at FIG. 29, fishing line cutting tool 300 may have a pair of carbide half-cylinders 400, 405 disposed within lumen 325 of hollow shaft 310. One half-cylinder, i.e., half-cylinder 400, is fixed to hollow shaft 310, and one half-cylinder, i.e., half-cylinder 405, is movable within lumen 325. The movable half-cylinder 405 is mounted to cutter shaft 365 so that it may be reciprocated within hollow shaft 310. Each half-cylinder 400, 405 is relieved, e.g., at 410 and 415, respectively, so that the reliefs 410, 415 are normally aligned with slot 330. As a result, when fishing line 305 is disposed in slot 330, it will also be disposed in reliefs 410, 415. In accordance with the present invention, when a fishing line is to be cut, the fishing line is disposed in slot 330 (and reliefs 410, 415 in half-cylinders 400, 405, respectively) and then plunger 380 is activated so as to drive cutter shaft 365 distally, whereby to drive half-cylinder 405 distally relative to half-cylinder 400, thereby shearing fishing line 305 at the interface of reliefs 410 and 415.

Figure 29B:
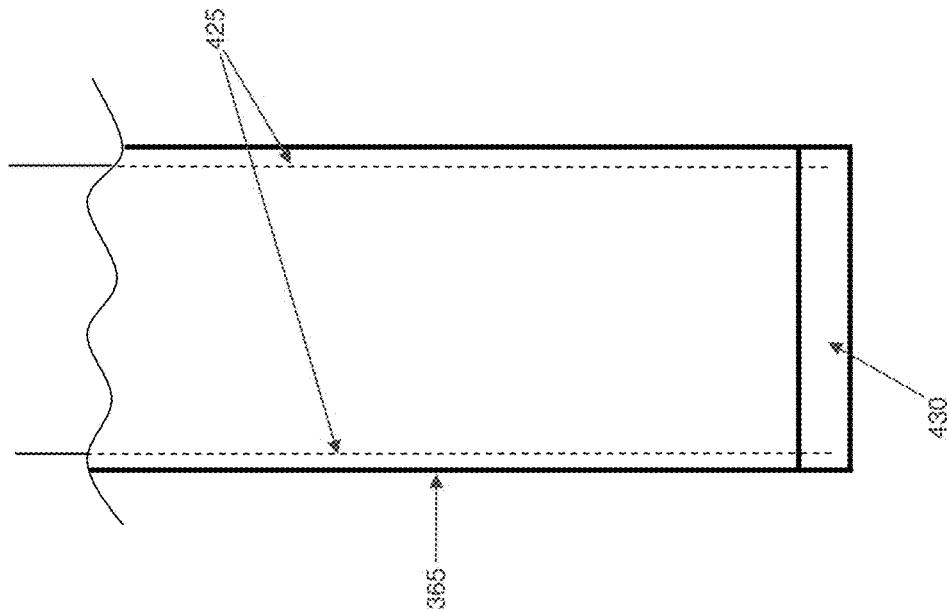
FIG. 29B is a schematic view showing another modified form of the fishing line cutter shown in FIGS. 22-27.
Figure 29A:
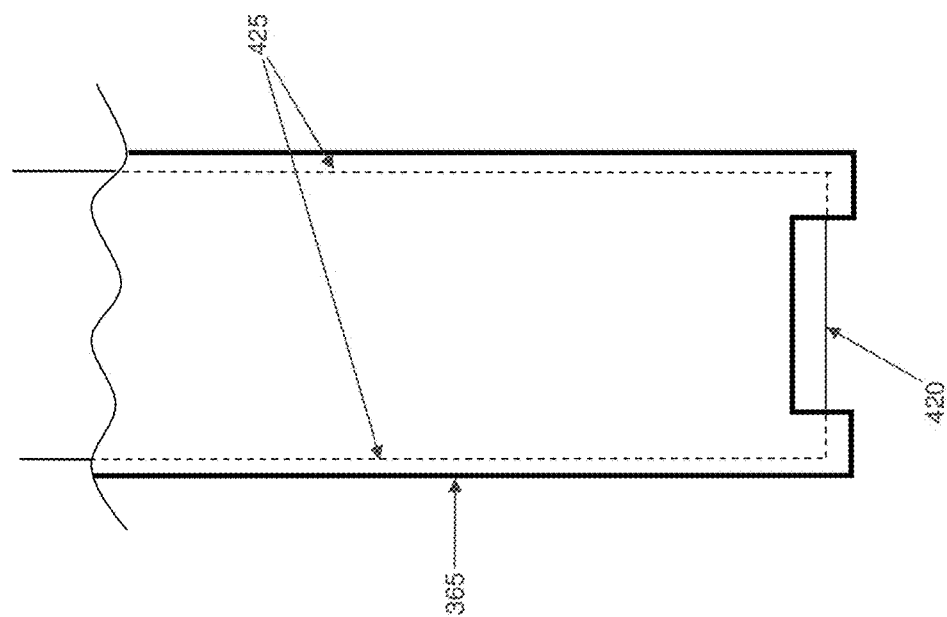
FIG. 29A is a schematic view showing another modified form of the fishing line cutter shown in FIGS. 22-27.

FIG. 29A shows another preferred construction for the present invention. In this form of the invention, the mechanical shearing action of the embodiments of FIGS. 22-27, 28 and 29 is replaced by a heat shearing action. More particularly, in this form of the invention, carbide cutting tip 390 (and/or carbide half-cylinders 400, 405) is omitted, and cutter shaft 365 is modified to carry a Nichrome wire 420 which is electrically energized by electrical wires 425 extending within cutter shaft 365 and connected to a switched power supply contained within handle 335. In this form of the invention, when a fishing line is to be cut, the fishing line is positioned in slot 330 of hollow shaft 310, Nichrome wire 420 is electrically energized so that it becomes hot, and then plunger 380 is used to bring Nichrome wire 420 across fishing line 305, whereupon the heated Nichrome wire melts its way through fishing line 305, thereby producing a "clean" cut through the fishing line, devoid of any frayed edges.

FIG. 29B shows a construction similar to that of FIG. 29A, except that Nichrome wire 420 is replaced by a heated element 430 disposed at the distal tip of cutter shaft 365 and electrically energized by electrical wires 425 extending within cutter shaft 365. In one form of the invention, heated element 430 may comprise a block resistance heater. In another form of the invention, heated element 430 may comprise a resistance film disposed on the leading portions of cutter shaft 365.

If desired, and looking now at FIG. 30, hollow shaft 310 may include a recess 500 so as to act as a knot pusher. Furthermore, if desired, slot leg 333 may open on distal end surface 321 (and, if desired, recess 500).

Figure 32:
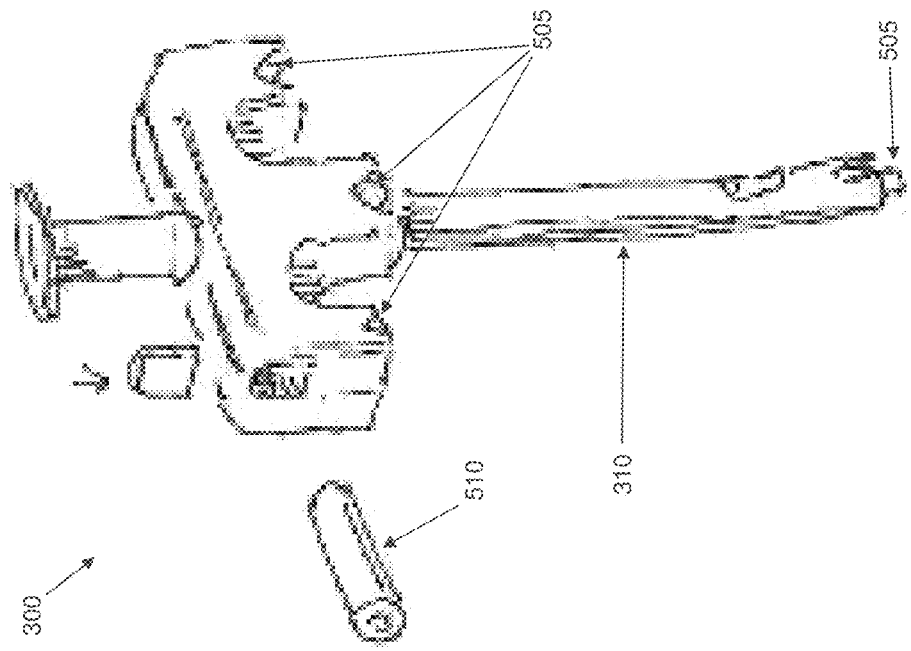
FIGS. 31-35 are schematic views showing still other modified forms of the fishing line cutter shown in FIGS. 22-27.
Figure 31:
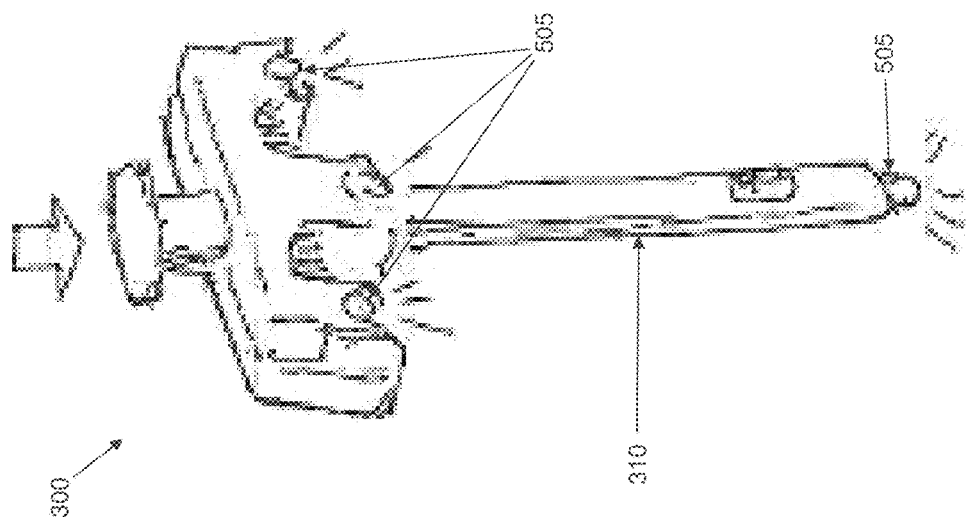
Figure 33:
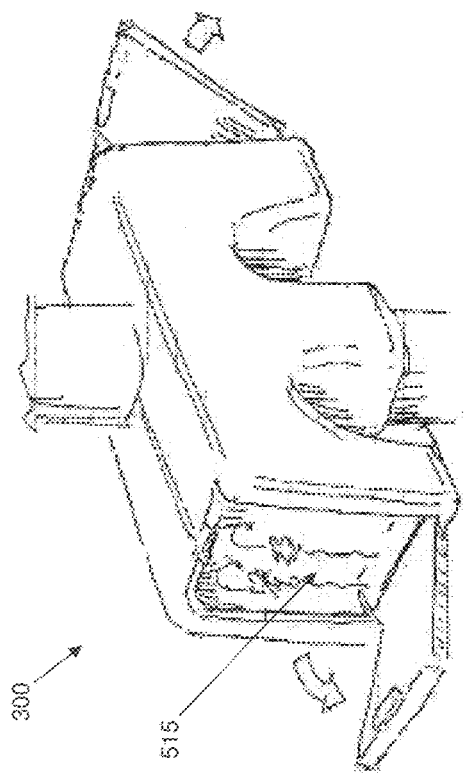
Figure 34:
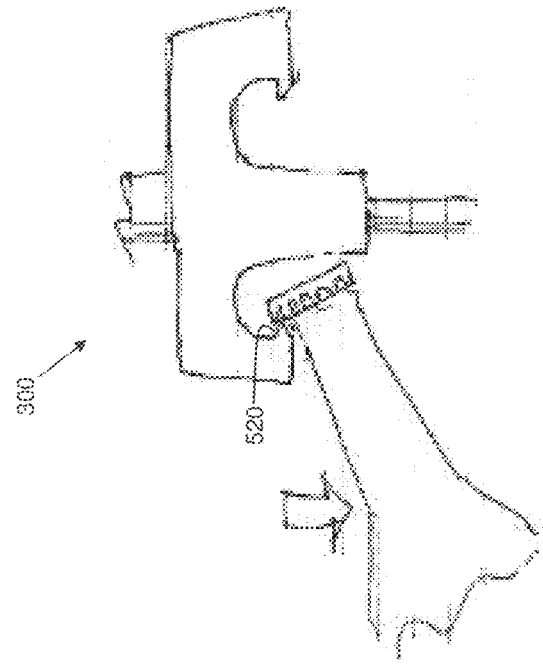

And if desired, and looking now at FIGS. 31 and 32, fishing line cutting tool 300 may include lights 505 powered by a battery 510.

If desired, handle 335 may include storage compartments 515 and/or a bottle opener 520.

Figure 35:
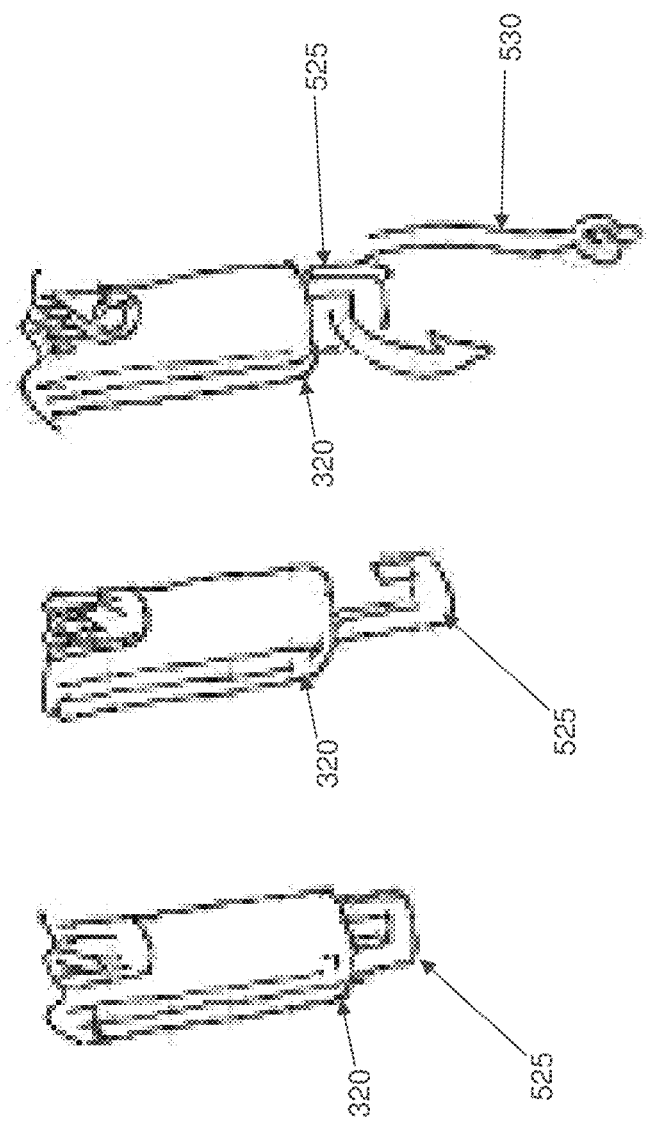

Furthermore, if desired, and looking now at FIG. 35, the distal end of drive shaft 365 may include a J-hook 525 formed thereon. J-hook 525 allows objects, e.g., a hook 530, to be grasped against the distal end surface 321 of fishing line cutting tool 300.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. An apparatus for cutting a fishing line, said apparatus comprising:
   a hollow shaft having a proximal end, a distal end, and a lumen extending therebetween, said lumen disposed along a longitudinally-extending hollow shaft axis, wherein said proximal end of said hollow shaft is formed of a first material and said distal end of said hollow shaft is formed of a second material, wherein said second material is harder than said first material;
   a slot formed in said hollow shaft and communicating with said lumen, said slot comprising a transversely-extending portion, a first leg extending parallel to said hollow shaft axis and a second leg extending parallel to said hollow shaft axis, wherein said transversely-extending portion of said slot extends at an angle relative to said hollow shaft axis, and further wherein said first leg terminates closer to said distal end of said hollow shaft than said second leg; and
   a cutter shaft movably disposed within said lumen so as to selectively cross said slot, whereby to cut a fishing line disposed in said slot, wherein said cutter shaft comprises a proximal end and a distal end, and further wherein said proximal end of said cutter shaft is formed of a third material and said distal end of said cutter shaft is formed of a fourth material, wherein said fourth material is harder than said third material, wherein the cutter shaft comprises two concentrically-disposed cylinders, an inner cylinder of the two concentrically-disposed cylinders extending through an outer cylinder of the two concentrically-disposed cylinders and protruding beyond the outer cylinder, the inner cylinder having a planar peripheral rim at a distal end of the inner cylinder.

2. The apparatus according to claim 1 wherein said cutter shaft is spring biased within said lumen.

3. The apparatus according to claim 1 wherein said fishing line is cut via a mechanical shearing action between said cutter shaft and said hollow shaft.

4. The apparatus according to claim 1 wherein said first material comprises plastic.

5. The apparatus according to claim 1 wherein said second material comprises stainless steel.

6. The apparatus according to claim 1 wherein said third material comprises one from the group consisting of stainless steel and plastic.

7. The apparatus according to claim 1 wherein said fourth material comprises carbide.

8. A method for cutting a fishing line, the method comprising:
   providing an apparatus comprising:
      a hollow shaft having a proximal end, a distal end, and a lumen extending therebetween, said lumen disposed along a longitudinally-extending hollow shaft axis, wherein said proximal end of said hollow shaft is formed of a first material and said distal end of said hollow shaft is formed of a second material, wherein said second material is harder than said first material;
      a slot formed in said hollow shaft and communicating with said lumen, said slot comprising a transversely-extending portion, a first leg extending parallel to said hollow shaft axis and a second leg extending parallel to said hollow shaft axis, wherein said transversely-extending portion of said slot extends at an angle relative to said hollow shaft axis, and further wherein said first leg terminates closer to said distal end of said hollow shaft than said second leg; and
      a cutter shaft movably disposed within said lumen so as to selectively cross said slot, whereby to cut a fishing line disposed in said slot, wherein said cutter shaft comprises a proximal end and a distal end, and further wherein said proximal end of said cutter shaft is formed of a third material and said distal end of said cutter shaft is formed of a fourth material, wherein said fourth material is harder than said third material, wherein the cutter shaft comprises two concentrically-disposed cylinders, an inner cylinder of the two concentrically-disposed cylinders extending through an outer cylinder of the two concentrically-disposed cylinders and protruding beyond the outer cylinder, the inner cylinder having a planar peripheral rim at a distal end of the inner cylinder;
   positioning a fishing line in said slot; and
   moving the cutter shaft within said lumen so as to cross said slot, whereby to cut the fishing line.

* * * * *